(12) United States Patent
Sivich et al.

(10) Patent No.: US 9,862,096 B2
(45) Date of Patent: Jan. 9, 2018

(54) AUTOMATED DYNAMIC MANUFACTURING SYSTEMS AND RELATED METHODS

(71) Applicant: The Boeing Company, Huntington Beach, CA (US)

(72) Inventors: Lorrie Sivich, Federal Way, WA (US); Thomas K. Williams, Federal Way, WA (US); Jim E. Gardiner, Everett, WA (US); Farshad Forouhar, Lake Forest Park, WA (US)

(73) Assignee: The Boeing Company, Chicago, IL (US)

( * ) Notice: Subject to any disclaimer, the term of this patent is extended or adjusted under 35 U.S.C. 154(b) by 88 days.

(21) Appl. No.: 14/673,433

(22) Filed: Mar. 30, 2015

(65) Prior Publication Data

US 2016/0288331 A1   Oct. 6, 2016

(51) Int. Cl.
| | |
|---|---|
| *G06F 7/00* | (2006.01) |
| *B25J 9/16* | (2006.01) |
| *G05B 19/418* | (2006.01) |
| *B64F 5/50* | (2017.01) |

(52) U.S. Cl.
CPC ............ *B25J 9/1697* (2013.01); *B25J 9/162* (2013.01); *B25J 9/1687* (2013.01); *B64F 5/50* (2017.01); *G05B 19/41895* (2013.01); *Y02P 90/285* (2015.11); *Y02P 90/60* (2015.11); *Y10S 901/01* (2013.01); *Y10S 901/06* (2013.01)

(58) Field of Classification Search
None
See application file for complete search history.

(56) References Cited

U.S. PATENT DOCUMENTS

| | | |
|---|---|---|
| 5,345,675 A | 9/1994 | Yamanaka et al. |
| 6,064,429 A | 5/2000 | Belk et al. |

(Continued)

OTHER PUBLICATIONS

European Patent Office, European Search Report for related European Patent Application No. 16161348, dated Aug. 12, 2016.
Sáez et al., "6DOF Entropy Minimization SLAM," IEEE International Conference on Robotics and Automation, Orlando, Florida, May 2006.
Nguyen et al., "A Lightweight SLAM Algorithm Using Orthogonal Planes for Indoor Mobile Robotics," IEEE/RSJ International Conference on Intelligent Robots and Systems, San Diego, California, Oct. 26-Nov. 2, 2007.

(Continued)

*Primary Examiner* — Yolanda Cumbess
(74) *Attorney, Agent, or Firm* — Dascenzo Intellectual Property Law, P.C.

(57) ABSTRACT

Automated dynamic manufacturing systems may provide for alignment of multiple components with respect to one another, such as an apparatus, a robot, and a supply of parts. The alignment may initially be performed roughly, using a global metrology device configured to track the apparatus, robot, and supply of parts, each of which may be movable with respect to the others, such as by being positioned on a respective automated guided vehicle. Alignment may then be performed to closer tolerances using a local metrology device coupled to the robot and configured to accurately position an end effector, such that the end effector may perform a manufacturing task on the apparatus, such as a pick-and-place process involving transporting an individual part from the supply of parts, transferring it to the apparatus, and coupling it thereto. Such systems and methods may be used to perform manufacturing processes on large apparatus, such as aircraft.

23 Claims, 6 Drawing Sheets

(56) References Cited

U.S. PATENT DOCUMENTS

| | | | | |
|---|---|---|---|---|
| 6,266,869 | B1* | 7/2001 | Tracy | G11B 5/4826 29/740 |
| 6,428,452 | B1 | 8/2002 | Dahlstrom | |
| 7,463,714 | B2 | 12/2008 | Edwards et al. | |
| 7,576,850 | B2 | 8/2009 | Englebart et al. | |
| 7,967,549 | B2 | 6/2011 | Geist et al. | |
| 8,286,323 | B2 | 10/2012 | Toh et al. | |
| 8,524,021 | B2 | 9/2013 | Englebart et al. | |
| 8,542,876 | B1 | 9/2013 | Engel et al. | |
| 2003/0208302 | A1* | 11/2003 | Lemelson | G05B 19/19 700/245 |
| 2009/0240372 | A1* | 9/2009 | Bordyn | B25J 9/1692 700/259 |
| 2010/0017033 | A1 | 1/2010 | Boca | |
| 2010/0042382 | A1 | 2/2010 | Marsh et al. | |
| 2013/0031764 | A1 | 2/2013 | Sahr et al. | |
| 2014/0195148 | A1 | 7/2014 | Erignac et al. | |
| 2014/0375794 | A1* | 12/2014 | Singh | B01J 19/121 348/95 |
| 2016/0158940 | A1* | 6/2016 | Brockway | B25J 9/1687 700/114 |

OTHER PUBLICATIONS

Buckingham et al, "Snake-Arm Robots: A New Approach to Aircraft Assembly," SAE Technical Paper 2007-01-3870, 2007.

Unpublished U.S. Appl. No. 14/182,263 to Wu et al., titled Method and System for Monitoring and Verifying a Manufacturing Process, filed Feb. 17, 2014.

Unpublished U.S. Appl. No. 14/311,041 to Sahr et al., titled Robot Alignment Systems and Methods of Aligning a Robot, filed Jun. 20, 2014.

"High-Flying Robotics," online article downloaded from http://www.aint.com/news_detail.php?jobid=23 on Apr. 11, 2014.

"Accuracy is No. 1 Challenge," online article downloaded from http://www.assemblymag.com/articles/86647-accuracy-is-no-1-challenge on Apr. 11, 2014.

"Aerospace Case Study," online article downloaded from http://www.ocrobotics.com/applications--solutions/aerospace/aerospace-case-study/ on Apr. 11, 2014.

"Boeing Robotic Wingbox," online article downloaded from http://www.stonelinks.org/projects/wingbox.html on Apr. 11, 2014.

* cited by examiner

AUTOMATED DYNAMIC MANUFACTURING SYSTEMS AND RELATED METHODS

FIELD

The present disclosure relates to automated dynamic manufacturing systems and related methods.

BACKGROUND

Robotic systems are commonly used in the manufacture of automobiles and other devices. Such systems commonly employ stationary, single-task robots that are designed to perform the same task, repeatedly, on a plurality of parts moving through an assembly line. Such systems are not readily scalable to industries involving larger assemblies, such as in the aerospace industry, due to the size of the parts and assemblies. Robotic systems used in aerospace manufacturing require large, expensive, support fixtures in order to fix tools, the apparatus, and the robot in space. Such support fixtures often include intricate cabling in order to provide power to the robotic systems, and also are often bolted in place, resulting in a very static system. These fixtures are required in order to ensure proper alignment of the robot with respect to the apparatus, and accurate performance of the task depends on the apparatus being located in space where the robot expects it to be located. The required tolerances in aerospace applications often are much smaller than in automobile applications, making the use of robotic systems even more challenging.

Furthermore, aerospace manufacturing processes often are performed in very large, open environments, which may be subject to variations due to vibrations and environmental factors (e.g., temperature, humidity, etc.). In addition, variations caused by wear or kinematic variation due to physical constraints can also be contributors to location uncertainties. This can include any motion control machine tool, robot, and/or end effector. Current motion control systems and automated robotic systems, due to their fixed nature, are not easily able to adapt to account for such variations.

SUMMARY

Presently disclosed automated dynamic manufacturing systems may address one or more of these and/or other issues in the prior art. For example, presently disclosed manufacturing systems may reduce required infrastructure, improve access to parts and interior spaces, reduce the amount of rework required, improve quality of resulting parts, increase flexibility of the manufacturing process, reduce tooling requirements, reduce part counts and weight, increase costs savings, increase build efficiency, reduce waste, increase safety and ergonomics for operators and technicians, and/or contribute to a more balance production flow.

For example, a system for performing a task on an apparatus may include the apparatus, a robot, a supply of parts, and a global metrology device. The supply of parts may include a plurality of parts located apart from the apparatus. The robot may include an end effector, wherein the end effector is configured to perform the task on the apparatus using one or more of the plurality of parts. The robot may include a local metrology device configured to position the end effector with respect to the apparatus using a local vision system (e.g., via closed loop feedback), such that the end effector is aligned with the apparatus sufficiently to perform the task. The global metrology device may be configured to track the positions of the apparatus, the robot, and the supply of parts using a global vision system. Furthermore, the global metrology device may be configured to communicate data to the robot (e.g., using closed loop feedback) about the positions of the apparatus and the supply of parts, and to receive feedback regarding actual positions of the robot, the apparatus, and the supply of parts. The local metrology device may be configured to supplement the global metrology device in positioning the end effector with respect to the apparatus and supply of parts so that the end effector may perform the task on or to the apparatus. Such presently disclosed systems may be used to create dynamic communication linkages between various production work cells in a manufacturing facility.

Methods of performing a manufacturing task using presently disclosed systems also are disclosed. Generally, presently disclosed methods may provide for modular component installation, assembly processes (e.g., for a wing or fuselage section) in an open environment and using a dynamic system in which all system components may be movable with respect to one another. Some methods may provide for assembly of systems or subsystems, systems or structural integration (e.g., linking together two or more systems or subsystems), and/or testing. For example, a method of performing a manufacturing process may include receiving rough alignment information from a global metrology device, the global metrology device being configured to track a respective position of each of an apparatus, a robot, and a supply of parts. The method may further include performing global alignment of the apparatus, the robot, and the supply of parts, receiving local alignment information from a local metrology device coupled to the robot, and performing fine alignment of an end effector coupled to the robot, the end effector being configured to perform a first task on the apparatus.

DESCRIPTION

Figure 1:
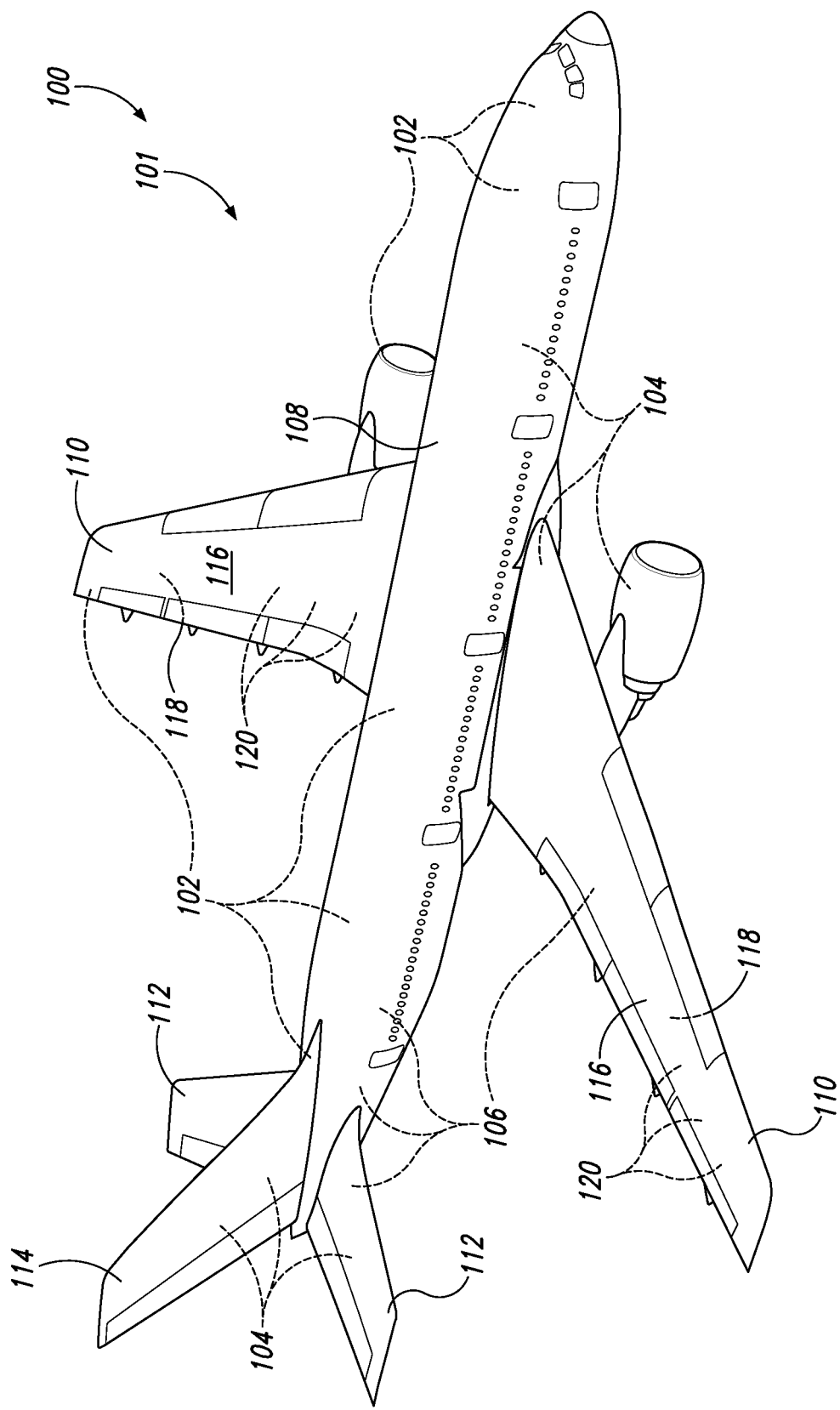
FIG. 1 is a perspective view of an illustrative, non-exclusive example of an aircraft that may include one or more parts, systems, and/or subsystems manufactured using systems and/or methods according to the present disclosure.

Automated dynamic manufacturing systems and related methods are disclosed herein. Such presently disclosed systems and methods may be used in manufacturing processes, such as in the building of aircraft or other large apparatus and/or components or subsystems thereof. In some examples, such systems and/or methods may be used in manufacturing an apparatus, such as apparatus 100, as schematically Illustrated in FIG. 1. For example, apparatus 100 may include one or more parts 102, systems 104, and/or subsystems 106 manufactured using systems and/or methods according to the present disclosure. Systems 104 and subsystems 106 may include, for example, electrical systems and subsystems, flight control systems and subsystems, engine systems and subsystems, landing gear systems and subsystems, hydraulics systems and subsystems, avionics systems and subsystems, fuel systems and subsystems, navigation systems and subsystems, communication systems and subsystems, cooling systems and subsystems, instrumentation and recording systems and subsystems, oil systems and subsystems, oxygen systems and subsystems, de-ice systems and subsystems, pressurization systems and subsystems, emergency equipment systems and subsystems, pneumatics systems and subsystems, power plant systems and subsystems, warning systems and subsystems, lighting systems and subsystems, in-flight entertainment systems and subsystems, ground systems and subsystems, and/or any other system or subsystem.

Apparatus 100 may be provided in the form of a passenger aircraft 101; however, other apparatuses 100 are within the scope of the present disclosure, and the present disclosure is not limited to aircraft and aircraft applications. For example, as illustrative, non-exclusive examples, other apparatuses 100 that may be constructed using systems and/or methods according to the present disclosure include (but are not limited to) watercraft, land vehicles, spacecraft, automobiles, military vehicles, and/or any other apparatus. Moreover, aircraft 101 may take any suitable form, including commercial aircraft, military aircraft, private aircraft, or any other suitable aircraft. While FIG. 1 illustrates aircraft 101 in the form of a fixed wing aircraft, other types and configurations of aircraft are within the scope of aircraft 101 according to the present disclosure, including (but not limited to) helicopters.

Aircraft 101 may include a fuselage 108, which also may be referred to herein as a barrel 108, and which generally corresponds to the main body of aircraft 101 for holding passengers, crew, cargo, and/or equipment, for example, depending on the particular configuration and/or function of an aircraft 101. Typically, although not required, the fuselage 108 of an aircraft 101 is elongate and somewhat cylindrical or tubular. In some embodiments, the fuselage 108 may be constructed of multiple sections that are longitudinally spaced along the fuselage 108 and operatively coupled together to define the fuselage 108.

Aircraft 101 also may include wings 110, horizontal stabilizers 112, and a vertical stabilizer 114, each of which may be constructed as a unitary structure or in subsections that are subsequently assembled together. One or more of fuselage 108, a wing 110, a horizontal stabilizer 112, a vertical stabilizer 114 or a structural subsection thereof may be constructed using systems and/or methods according to the present disclosure. For example, in conventional methods, wings 110 are constructed by assembling an upper skin 116 and lower skin 118 to wing spars 120, which requires manufacturing steps to be performed on the interior of the wing 110 after such assembly, through small access ports formed in the wing 110. Such techniques are ergonomically and technically challenging to perform, in addition to being labor-intensive. Presently disclosed automated dynamic manufacturing systems and related methods may enable such manufacturing steps to be performed using robotic systems (e.g., automated robotic systems and/or manual motion control systems to position objects in space).

Figure 2:
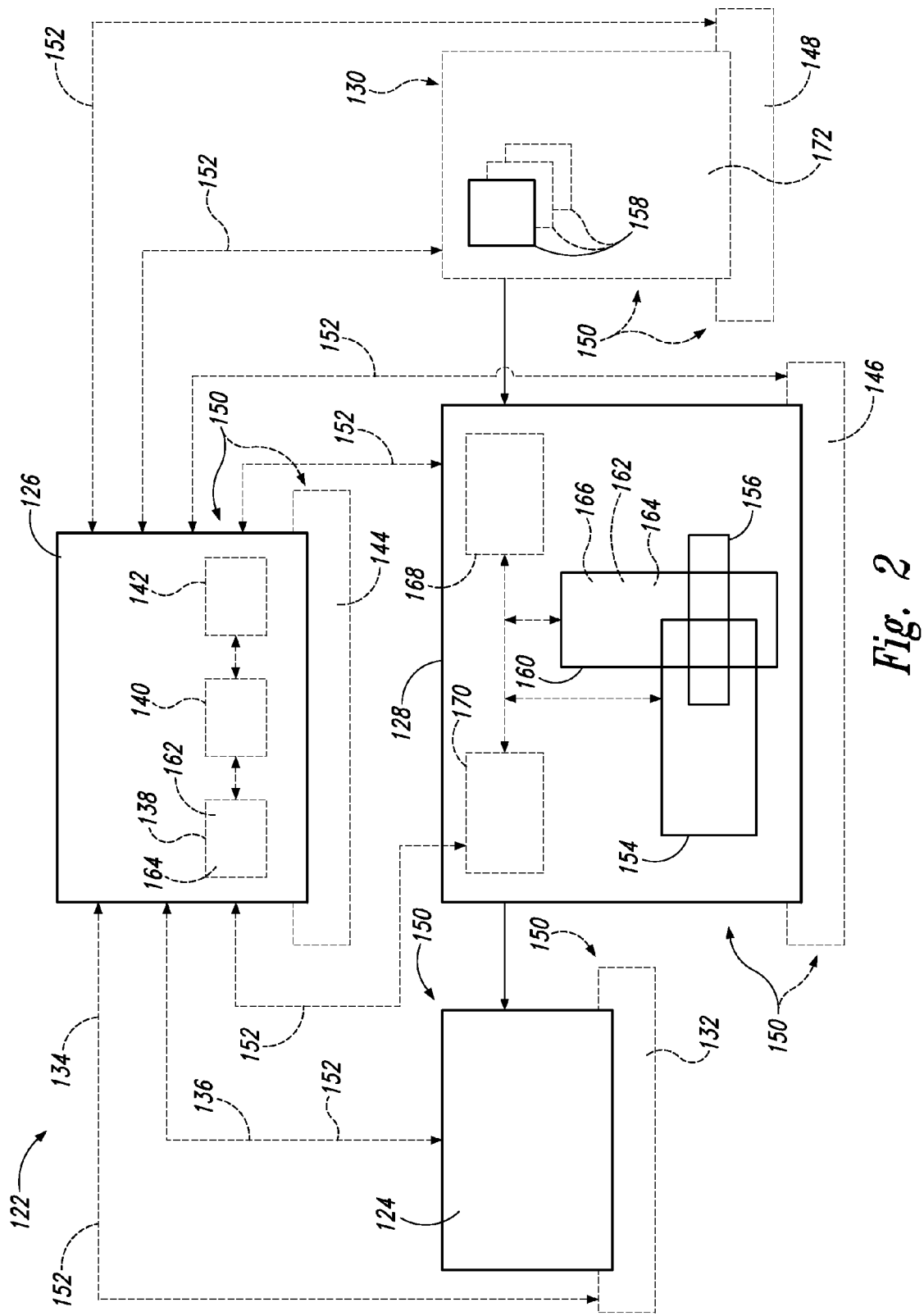
FIG. 2 is a schematic representation of illustrative, non-exclusive examples of automated, dynamic systems for performing a manufacturing task, according to the present disclosure.

Turning now to FIG. 2, automated dynamic manufacturing systems 122 (which also may be referred to herein as manufacturing systems 122) are illustrated in schematic form. Generally, manufacturing systems 122 for manufacturing an apparatus 124 (which may be an example of apparatus 100) may include a global metrology device 126, a robot 128, and a supply of parts 130. Systems 122 may be configured to perform a task on apparatus 124. Generally, in the figures, elements that are likely to be included in a given example are illustrated in solid lines, while elements that are optional to a given example are illustrated in broken lines. However, elements that are illustrated in solid lines are not essential to all examples of the present disclosure, and an element shown in solid lines may be omitted from a given example without departing from the scope of the present disclosure.

Apparatus 124 may be, for example, an aircraft (e.g., a passenger aircraft such as aircraft 101 of FIG. 1), or any other device or component thereof. For example, apparatus 124 may include a component, system, subsystem, structure, and/or part of an aircraft or other device. In specific examples, apparatus 124 may include a wing (e.g., wing 110 of FIG. 1), a fuselage (e.g., fuselage 108 of FIG. 1), a part of an aircraft or other device (e.g., part 102 of FIG. 1), a system of an aircraft or other device (e.g., system 104 of FIG. 1), and/or a subsystem of an aircraft or other device (e.g., subsystem 106 of FIG. 1). In some examples, apparatus 124 may be positioned on a first automated guided vehicle 132 that may be mobile and configured to move apparatus 124 with respect to supply of parts 130, robot 128, and/or global metrology device 126. For example, first automated guided vehicle 132 may be configured to translate apparatus 124 in at least two different directions with respect to one or more of supply of parts 130, robot 128, and global metrology device 126. For example, first automated guided vehicle 132 may be configured to move apparatus 124 linearly back and forth in a straight line. In other examples, first automated guided vehicle 132 may be configured to move apparatus 124 in two different perpendicular directions (e.g., along an X axis and along a Y axis, the X axis and Y axis being perpendicular to each other). In some examples, first automated guided vehicle 132 may be configured to move apparatus 124 in at least three different perpendicular directions, such as being configured to translate apparatus 124 in a flat (e.g., horizontal) plane and also being configured to move apparatus 124 in an orthogonal direction (e.g., vertically up and down). Additionally or alternatively, first automated guided vehicle 132 may be configured to rotate apparatus 124.

First automated guided vehicle 132 may be configured to send and/or receive data 152 (which may also be referred to herein as feedback 152), such as guided vehicle information 134 to/from global metrology device 126. For example, first automated guided vehicle 132 may be configured to move apparatus 124 in response to instructions received from another component of system 122 (e.g., in response to guided vehicle information 134 received from global metrology device 126), in response to pre-programmed instructions, and/or in response to instructions received from an operator or user. Guided vehicle information 134 may include feedback 152 from first automated guided vehicle 132 to global metrology device 126, instructions from global metrology device 126 to first automated guided vehicle 132 (e.g., instructions to move apparatus 124 to a certain position or a certain distance), and/or any other data, which may be transmitted and/or received wirelessly to and/or from global metrology device 126. Additionally or alternatively, apparatus 124 may be configured to send and/or receive data 152, such as apparatus information 136, to/from global metrology device 126. Apparatus information 136 may include, for example, feedback about the position of apparatus 124, captured images of apparatus 124, and/or any other information.

Global metrology device 126 may be configured to track the positions of apparatus 124, robot 128, and/or supply of parts 130. Global metrology device 126 may generally include a global vision system 138, a processor 140, and/or a communications system 142. Global vision system 138 may be configured to track apparatus 124, robot 128, and/or supply of parts 130. For example, global vision system 138 may include one or more cameras 162 (e.g., 3D cameras 162), one or more laser devices 164, and/or any other device that may be configured to track the positions of the other components of manufacturing system 122. Global vision system 138 may be configured to track the relative positions of each of apparatus 124, robot 128, and/or supply of parts 130 with respect to one another. Additionally or alternatively, global vision system 138 may be configured to track absolute positions of apparatus 124, robot 128, and/or supply of parts 130 with respect to a reference point. In some examples, global vision system 138 may record a plurality of images of apparatus 124, robot 128, and/or supply of parts 130 in order to determine the positions of each. In some examples, the plurality of images may be stitched together in order to determine the three dimensional ("3D") coordinates of the respective component (e.g., a plurality of images of apparatus 124 may be stitched together to determine the 3D coordinates of the position of apparatus 124).

Global vision system 138 may be configured to track apparatus 124 and/or first automated guided vehicle 132. Image data may be included in data 152 (e.g., in guided vehicle information 134 and/or apparatus information 136). Global vision system 138 may utilize stationary fiducial targeting, active LED fiducial targeting, and/or non-contact fiducial targets. In some examples, global vision system 138 may include a multiple LED probe system. Global vision system 138 may be configured to store a part coordinate system and optically track each of apparatus 124, robot 128, and/or supply of parts 130 in order to create data points for each on the part coordinate system. Global metrology device 126 may include pre-programmed information about the geometries of each of apparatus 124, robot 128, and/or supply of parts 130, and may combine such pre-programmed geometric information with data gathered by global vision system 138 in order to track each of apparatus 124, robot 128, and/or supply of parts 130. Similarly, global vision system 138 may be configured to track robot 128, a third automated guided vehicle 146 on which robot 128 is positioned, supply of parts 130, and/or a fourth automated guided vehicle 148 on which supply of parts 130 is positioned. One or more of first automated guided vehicle 132, a second automated guided vehicle 144 on which global metrology device 126 may be positioned, third automated guided vehicle 146, and fourth automated guided vehicle 148 may be configured to be automated and/or may be configured for manual motion control, such that they are positionable in space in response to received telemetric commands.

As indicated in FIG. 2, processor 140 may receive data from global vision system 138 in order to determine the positions of apparatus 124, robot 128, supply of parts 130, first automated guided vehicle 132, second automated guided vehicle 144, third automated guided vehicle 146, and/or fourth automated guided vehicle 148 (collectively referred to as system components 150) and any necessary adjustments of alignment of each with respect to the others. Processor 140 may be configured to translate information from tracking the positions of apparatus 124, robot 128, and/or supply of parts 130 into first instructions for moving apparatus 124, second instructions for moving robot 128, and/or third instructions for moving supply of parts 130. For example, processor 140 may be configured to store an identity matrix of coordinates for each system component 150 and create an updated matrix for translating and/or rotating one or more system components 150 in response to information gathered from global vision system 138 and/or communications device 142. Communications device 142 may in turn communicate with each respective system component 150 in order to effectuate movement of the respective system component 150 in accordance with the instructions from processor 140.

For example, communications device 142 may be configured to communicate to first automated guided vehicle 132 instructions for moving apparatus 124 (thereby effectuating movement of apparatus 124), may be configured to communicate to third automated guided vehicle 146 instructions for moving robot 128 (thereby effectuating movement of robot 128), and/or may be configured to communicate to fourth automated guided vehicle 148 instructions for moving supply of parts 130 (thereby effectuating movement of supply of parts 130). In this manner, global metrology device 126 may be configured to effectuate coarse alignment of one or more respective system components 150 with respect to one or more others of the system components. Global metrology device 126 (e.g., communications device 142 of global metrology device 126) may be configured to provide and/or receive real-time feedback 152 to and/or from one or more system components 150 (e.g., feedback 152 regarding the respective position of one or more of the respective system components 150), which feedback 152 may be communicated with processor 140. In some examples, processor 140 may use feedback 152 received from one or more system components 150 in order to update instructions for positioning one or more system components 150, and may communicate data 152 to one or more system components 150 containing said instructions or other information.

Global metrology device 126 may be substantially stationary with respect to apparatus 124, robot 128, and/or supply of parts 130 in some examples. In other examples, global metrology device 126 may be positioned on second automated guided vehicle 144, which may be configured to move global metrology device 126 with respect to apparatus 124, robot 128, and/or supply of parts 130. For example, second automated guided vehicle 144 may be configured to translate global metrology device 126 in at least two different directions with respect to one or more of supply of parts 130, robot 128, and apparatus 124. For example, second automated guided vehicle 144 may be configured to move global metrology device 126 linearly back and forth in a straight line. In other examples, second automated guided vehicle 144 may be configured to move global metrology device 126 in two different perpendicular directions (e.g., along an X axis and along a Y axis, the X axis and Y axis being perpendicular to each other). In some examples, second automated guided vehicle 144 may be configured to move global metrology device 126 in at least three different perpendicular directions, such as being configured to translate global metrology device 126 in a flat (e.g., horizontal) plane and also being configured to move global metrology device 126 in an orthogonal direction (e.g., vertically up and down). Additionally or alternatively, second automated guided vehicle 144 may be configured to rotate global metrology device 126.

Robot 128 may include an automated robot and/or a manual motion control system configured to position objects in space. Robot 128 may include an end effector 154, which may be configured to perform one or more tasks on apparatus 124. For example, a tool 156 may be coupled to end effector 154, the tool being used to perform one or more tasks on apparatus 124. In other examples, end effector 154 may directly perform the task, without tool 156. End effector 154 may include a folding arm, a telescoping arm, a retractable arm, a snake robot structure, an articulating arm and/or any structure that may be configured to position end effector 154 and/or tool 156. End effector 154 and/or tool 156 may include a welding head, a spray paint gun, a scalpel, a cutting device, a fastening device, a gripping device, jaws, claws, pins, needles, a suction device, a camera, a sanding device, an adhesive applicator, a brush, a drill, a magnet, a screw driver, a clamp, a deburring tool, a rotary joint, and/or any customized tool designed for a specific task to be performed. Different tools 156 and/or end effectors 154 may be coupled to robot 128 in order to perform different tasks. In this manner, robot 128 may be configured to perform a plurality of different tasks on or to apparatus 124, using a plurality of different tools 156 and/or end effectors 154, each being configured to perform a different task.

Tool 156 and/or end effector 154 may be removable from robot 128 such that a different type of tool or end effector may be placed thereon in order to perform a different task. In some examples, end effector 154 and/or tool 156 may perform a task using one or more of parts 158 of supply of parts 130. For example, robot 128 may be configured to perform a "pick and place" task, wherein a respective part 158 is removed from supply of parts 130, moved to a location adjacent apparatus 124, and coupled to apparatus 124. The operation may then be repeated with a second respective part 158, which may be placed in a different location on apparatus 124. Robot 128, end effector 154, and tool 156 may be configured to perform any suitable task, including but not limited to, moving one or more parts 158, moving apparatus 124, moving robot 128, moving end effector 154, moving tool 156, installing a component such as a respective part 158, an assembly process, system integration, testing, machining, laying-up, painting, sealing, fabrication, quality assurance inspection, verification, and/or validation.

Robot 128 may include a local metrology device 160 configured to position end effector 154 and/or tool 156 with respect to apparatus 124, supply of parts 130, and/or global metrology device 126. Local metrology device 160 may include a local vision system 166, which may include one or more cameras 162 (e.g., a 3D camera 162) and/or one or more laser devices 164. In some examples, local metrology device 160 may be configured to perform fine alignment of end effector 154 and/or tool 156 with respect to apparatus 124 and/or supply of parts 130. For example, global metrology device 126 may roughly position end effector 154 near apparatus 124, and local metrology device 160 may be configured to position end effector 154 with much higher resolution (e.g., within a lower tolerance) than global metrology device 126. Robot 128 also may include a local processor 168 and/or a robot communications device 170 for translating data received from local metrology device 160, receiving instructions from global metrology device 126, and/or providing feedback 152 (e.g., closed loop feedback) to global metrology device 126 regarding the position of robot 128, end effector 154, and/or tool 156.

Local metrology device 160 may be proximal to and/or coupled to robot 128, end effector 154, and/or tool 156 and may be configured to supplement global metrology device 126 in aligning system components 150 with respect to one another in order to perform one or more tasks. For example, local metrology device 160 may be configured to improve positioning accuracy of end effector 154 and/or tool 156 as compared to using global metrology device 126 alone. In some examples, local metrology device 160 may be configured to perform positioning of end effector 154 and/or tool 156 at a higher resolution than global metrology device 126. For example, local metrology device 160 may be configured to perform positioning at a resolution that is at least two times, at least five times, at least ten times, and/or at least 20 times higher than the resolution provided by global metrology device 126. In some manufacturing systems, local metrology device 160 may be configured to position end effector 154 and/or tool 156 within certain tolerances, such as within a tolerance of 0.1 inches (2.5 mm), within a tolerance of 0.05 inches (1.25 mm), within a tolerance of 0.01 inches (0.25 mm), within a tolerance of 0.005 inches (0.125 mm), and/or within a tolerance of 0.001 inches (0.025 mm) of the intended position or alignment.

Robot 128 may be a mobile robot 128 in some manufacturing systems 122 (e.g., the entire robot 128 may be movable with respect to apparatus 124, global metrology device 126, and/or supply of parts 130 in response to a telemetric command (e.g., via manual motion control), in response to instructions received from global metrology device 126, and/or in response to an automated or pre-programmed process stored within robot 128 or calculated by robot 128). Additionally or alternatively, robot 128 may be positioned on third automated guided vehicle 146, which may be configured to move robot 128 with respect to apparatus 124, global metrology device 126, and/or supply of parts 130. For example, third automated guided vehicle 146 may be configured to translate robot 128 in at least two different directions with respect to one or more of supply of parts 130, global metrology device 126, and apparatus 124. For example, third automated guided vehicle 146 may be configured to move robot 128 linearly back and forth in a straight line. In other examples, third automated guided vehicle 146 may be configured to move robot 128 in two different perpendicular directions (e.g., along an X axis and along a Y axis, the X axis and Y axis being perpendicular to each other). In some examples, third automated guided vehicle 146 may be configured to move robot 128 in at least three different perpendicular directions, such as being configured to translate robot 128 in a flat (e.g., horizontal) plane and also being configured to move robot 128 in an orthogonal direction (e.g., vertically up and down). Additionally or alternatively, third automated guided vehicle 146 may be configured to rotate robot 128.

Such motion of robot 128 on third automated guided vehicle 146 may be customizable for different tasks to be performed by robot 128. For example, in a pick and place task, third automated guided vehicle 146 may be configured to move robot 128 back and forth between supply of parts 130 and apparatus 124, wherein robot 128 is configured to obtain a part 158 from supply of parts 130, third automated guided vehicle 146 then moves robot 128 to a position adjacent apparatus 124, and robot 128 may then place the respective part 158 on apparatus 124. Third automated guided vehicle 146 may then be configured to move robot 128 back to a position adjacent supply of parts 130 so that the task may be repeated a plurality of times with a different respective part 158 from supply of parts 130, such that after the task is repeated a plurality of times, a plurality of respective parts 158 have been moved from supply of parts 130 to placement in a respective location on apparatus 124. As each respective part 158 may be in a slightly different position within supply of parts 130 (e.g., parts 158 may be spread into an array, spaced apart from one another within a container 172), the position of end effector 154 may be adjusted by local metrology device 160 each time robot 128 returns to supply of parts 130 in order to accurately obtain a respective part 158 each time. In these applications, end effector 154 and/or tool 156 may be configured to move at least one respective part 158 from supply of parts 130 to or towards apparatus 124. Once adjacent apparatus 124, end effector 154 and/or tool 156 may be configured to couple the respective part 158 to apparatus 124.

Supply of parts 130 may be located apart from apparatus 124 (e.g., not in physical contact with apparatus 124) and may include one or more parts 158. For example, supply of parts 130 may include a plurality of parts 158, wherein each respective part 158 is identical. In other examples, supply of parts 130 may include a plurality of different parts 158. Parts 158 may be configured to be removed, one at a time, from supply of parts 130, and moved to or towards apparatus 124, such as to perform a task on part 158 and/or apparatus 124 (e.g., in a pick and place operation, a part 158 may be removed from supply of parts 130 by robot 128, and moved to apparatus 124, where it may be coupled to apparatus 124). Supply of parts 130 may include a container 172 for holding or containing parts 158. Container 172 may simply be a platform, a box, a surface, a frame, or any other structure supporting parts 158. Parts 158 may be any suitable parts used in any manufacturing process. For example, parts 158 may include panels, fasteners, electrical components, and/or any other parts or structures.

In some examples, supply of parts 130 may be substantially stationary with respect to global metrology device 126, robot 128, and apparatus 124. Alternatively, supply of parts 130 may be positioned on fourth automated guided vehicle 148, which may be configured to move supply of parts 130 with respect to apparatus 124, global metrology device 126, and/or robot 128. For example, fourth automated guided vehicle 148 may be configured to translate supply of parts 130 in at least two different directions with respect to one or more of robot 128, global metrology device 126, and apparatus 124. For example, fourth automated guided vehicle 148 may be configured to move supply of parts 130 linearly back and forth in a straight line. In other examples, fourth automated guided vehicle 148 may be configured to move supply of parts 130 in two different perpendicular directions (e.g., along an X axis and along a Y axis, the X axis and Y axis being perpendicular to each other). In some examples, fourth automated guided vehicle 148 may be configured to move supply of parts 130 in at least three different perpendicular directions, such as being configured to translate supply of parts 130 in a flat (e.g., horizontal) plane and also being configured to move supply of parts 130 in an orthogonal direction (e.g., vertically up and down). Additionally or alternatively, fourth automated guided vehicle 148 may be configured to rotate supply of parts 130.

Generally, manufacturing system 122 (e.g., all system components 150) may be configured to effectuate performance of a task on or to apparatus 124 and/or on or to a part 158. System components 150 may be configured to work together such that initial alignment may be performed by global metrology device 126, and more precise alignment may be performed by local metrology device 160 on robot 128. All system components 150 may be configured to move with respect to one another, such that manufacturing system 122 is dynamic, thereby eliminating the need for complex framework and support structures needed in prior art methods to stabilize components and ensure that the components are kept stationary. By contrast, in presently disclosed manufacturing systems 122, each system component 150 may be moveable, with global metrology device 126 unifying system 122, tracking the positions of each of system components 150. Manufacturing systems 122 may be entirely automated, such that tasks may be performed on and/or to apparatus 124 and/or on and/or to part 158 (e.g., a plurality of different tasks may be performed, and/or a single task may be performed a plurality of times) without requiring intervention by a technician or operator.

Such presently disclosed manufacturing systems 122 may advantageously be able to correct for variations caused by wear of system components 150, vibration in the work environment, environmental factors (e.g., temperature, humidity, etc.), non-ideality of system components 150, kinematic variation due to physical constraints, and/or different models, types, styles, or brands of system components 150. Such adaptability may be at least partially due to the dynamic nature of manufacturing systems 122. Presently disclosed manufacturing systems 122 may provide a robotic manufacturing system that does not need to have bolted down components, fixtures, or complex cabling for the system components. Furthermore, each robot 128 may be capable of performing a plurality of different tasks, due to the mobile nature of the robot 128 and/or third automated guided vehicle 146 on which robot 128 is positioned. Presently disclosed manufacturing systems 122 also may advantageously be used to perform ergonomically difficult or labor-intensive techniques, such as those that are performed through small access holes formed in parts (e.g., wing boxes).

Presently disclosed manufacturing systems 122 may be used to create a dynamic manufacturing environment. For example, work cells in a manufacturing facility may be reconfigurable for different tasks and/or industries when using presently disclosed manufacturing systems 122, as opposed to conventional manufacturing techniques involving static fixtures (e.g., manufacturing robots that are bolted in place). Using presently disclosed manufacturing systems 122, a given robot 128 and/or end effector 154 may be changed in order to perform a different task in a given work cell. Additionally or alternatively, manufacturing systems 122 may be configured to enable communication between work cells in a manufacturing facility (e.g., global metrology device 126 may be configured to communicate with two or more different robots 128 in different work cells, performing different tasks on a respective apparatus 124 and/or part 158). Manufacturing systems 122 that are configured for closed loop feedback between end effector 154 and global metrology device 126 and local metrology device 160 may also enable communication with other devices that may improve performance of automated production systems.

Additionally or alternatively, presently disclosed manufacturing systems 122 may be configured to determine positions of various system components 150 based on features of the respective system component 150, as opposed to conventional systems, which require the placement of "targets" on the part or apparatus in order to determine their respective positions. Because presently disclosed manufacturing systems 122 may determine positions based on component features as opposed to using placed targets, position determination may be faster and more efficient (e.g., the amount of data collected may be reduced in some examples).

Presently disclosed manufacturing systems 122 may include system components 150 that are sensor-driven and/or data-driven. For example, one or more system components 150 may be configured to move in response to data received from one or more other system components 150 and/or data received from a manual motion control device. Additionally or alternatively, one or more system components 150 may be configured to move in response to data collected by one or more sensors on the respective system component 150. Furthermore, in addition to communicating with global metrology device 126 and/or one or more other respective system components 150, one or more system components 150 may be configured to communicate with other devices as well. For example, one or more system components 150 may be configured to create a dynamic communication linkage with one or more external devices, linking 3D coordinates corresponding to one or more system components 150 to other devices and/or systems, such as by interacting with end-user devices (e.g., augmented reality used with tablets and/or headsets).

Figure 3:
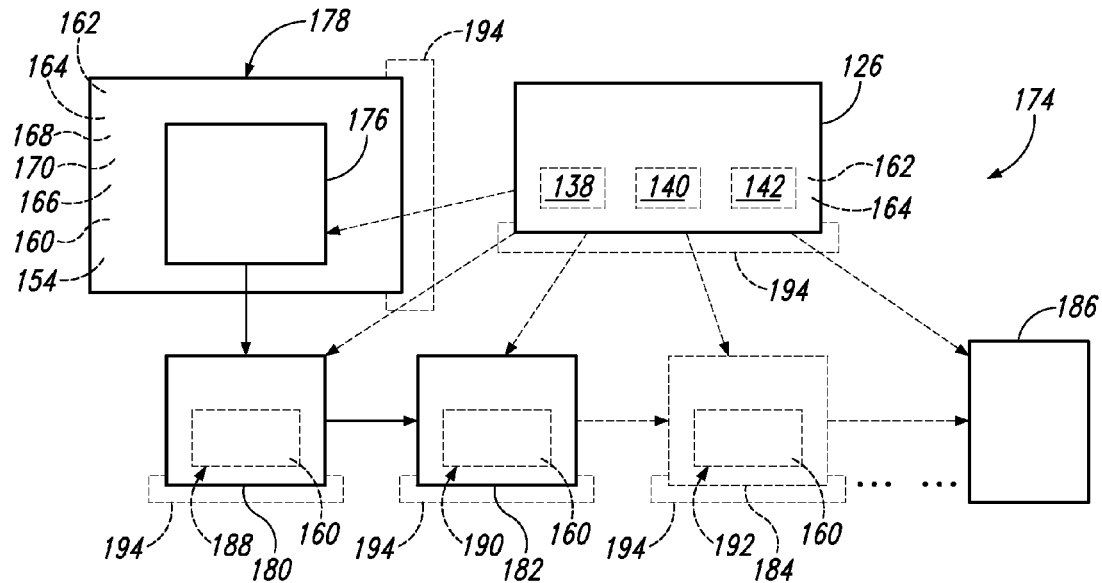
FIG. 3 is a schematic representation of illustrative, non-exclusive examples of automated, dynamic systems for performing a manufacturing task, according to the present disclosure.

FIG. 3 illustrates a second manufacturing system 174 according to the present disclosure, said second manufacturing system 174 also being autonomous and dynamic and configured to perform a plurality of tasks on a second part 176, which may be an example of part 158 of FIG. 2, apparatus 100 of FIG. 1, and/or apparatus 124 of FIG. 2. A mobile robot 178 (which may be an example of robot 128 of FIG. 2 and/or an automated guided vehicle, such as first automated guided vehicle 132 of FIG. 2) may be configured to move part 176 to a plurality of stations (e.g., first station 180, second station 182, third station 184, and so on), where a different task may be performed on part 176 at each respective station in order to form a completed part 186. Global metrology device 126 may be configured to track the positions of second part 176, mobile robot 178, and each respective station (e.g., first station 180, second station 182, and etc.), and mobile robot 178 may be configured to move second part 176 sequentially to each of the plurality of stations in order to complete one or more manufacturing processes. Mobile robot 178 may include local metrology device 160 coupled to mobile robot 178 that may be configured to track and position end effector 154, which may be configured to engage with second part 176 in order to move it from station to station after each respective task has been performed on second part 176. Mobile robot 178 may include a robot communications device 170 configured to receive information from global metrology device 126 regarding the positions of second part 176 and one or more of the plurality of stations 180, 182, 184.

In some systems 174, each respective station 180, 182, 184 may include a respective task robot configured to perform a different task on second part 176. For example, first station 180 may include a first task robot 188, second station 182 may include a second task robot 190, third station 184 may include a third task robot 192, and etc. Each of first task robot 188, second task robot 190, and third task robot 192 may be configured to perform a different task on second part 176. One or more of mobile robot 178, first station 180, second station 182, third station 184, global metrology device 126, and second part 176 may be positioned on a respective automated guided vehicle 194, which may be configured to move the respective system component with respect to the others of the system components.

Manufacturing systems 122 and/or systems 174 may be used to perform various tasks, methods and/or manufacturing processes, such as in methods performed during the manufacture of an aircraft. FIGS. 4-7 schematically provide flowcharts that represent illustrative, non-exclusive examples of such methods 400, 500, 600, 700 according to the present disclosure and associated with manufacturing systems 122 of FIG. 2 and/or systems 174 of FIG. 3. Any of the methods of FIGS. 4-7 may be used in a manufacturing process, such as in the manufacture of an aircraft. In FIGS. 4-7, some steps are illustrated in dashed boxes indicating that such steps may be optional or may correspond to an optional version of a method according to the present disclosure. That said, not all methods according to the present disclosure are required to include the steps illustrated in solid boxes. The methods and steps illustrated in FIGS. 4-7 are not limiting and other methods and steps are within the scope of the present disclosure, including methods having greater than or fewer than the number of steps illustrated, as understood from the discussions herein.

Figure 4:
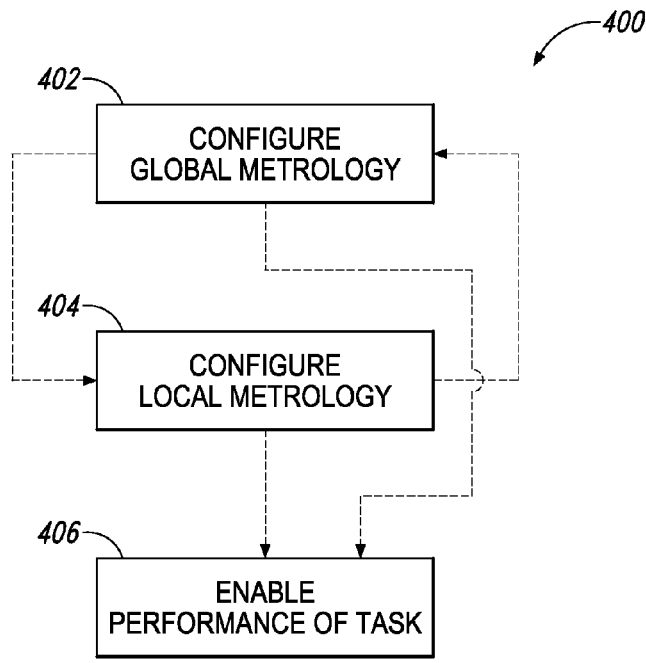
FIG. 4 is a schematic block diagram illustrating methods of performing a manufacturing process according to the present disclosure.

FIG. 4 illustrates methods 400 of performing a manufacturing process using a system (e.g., manufacturing system 122 of FIG. 2 and/or system 174 of FIG. 3). Methods 400 may include configuring a global metrology device (e.g., global metrology device 126 of FIG. 2) of the system to perform global alignment of an apparatus (e.g., apparatus 124 of FIG. 2 or second part 176 of FIG. 3), a robot (e.g., robot 128 of FIG. 2 and/or mobile robot 178 of FIG. 3), and/or a supply of parts (e.g., supply of parts 130 of FIG. 2) using the global metrology device at 402. The global metrology device may be configured to track the positions of the apparatus, the robot, and the supply of parts, and the global metrology device may be further configured to instruct and cause movement of the apparatus, the robot, and/or the supply of parts with respect to the global metrology device. Methods 400 also may include configuring a local metrology device (e.g., local metrology device 160 of FIG. 2) of the system to perform local alignment of an end effector (e.g., end effector 154) of the robot with respect to the apparatus at 404, the local metrology device being coupled to the robot. Performance of a task on or to the apparatus may be enabled at 406, such that the end effector of the robot and a part from the supply of parts are used in performance of the task. For example, enabling performance of a task at 406 may include initiating operation of one or more system components (e.g., system components 150 of FIG. 2), placing one or more parts (e.g., parts 158 of FIG. 2) in a container (e.g., container 172 of FIG. 2) to form the supply of parts, providing the apparatus, providing the robot, providing the global metrology device, or any other preliminary step.

In some methods 400, enabling performance of a task at 406 may include enabling the robot to perform the task autonomously, such as by installing software effectuating the same on the robot, instructing the robot to perform the task autonomously, programming the robot to perform the task autonomously, and/or any other step that may contribute to enabling performance of one or more tasks.

Configuring the global metrology device at 402 may include positioning the global metrology device on an automated guided vehicle (e.g., second automated guided vehicle 144 of FIG. 2), the automated guided vehicle being configured to move the global metrology device with respect to the apparatus, the supply of parts, and/or the robot. Additionally or alternatively, configuring the global metrology device to perform global alignment at 402 may include configuring the global metrology device to instruct movement of the automated guided vehicle with the global metrology device positioned thereon.

In some methods 400, configuring the global metrology device at 402 may include configuring the global metrology device to adjust positions of the global metrology device, the robot, the supply of parts, and/or the apparatus autonomously, in order to enable alignment of the end effector in order to adequately perform a task. Configuring the global metrology device at 402 may include configuring the global metrology device to track the apparatus, such as by configuring the global metrology device to compile together a plurality of images of the apparatus in order to determine a position of the apparatus. In some methods, the global metrology device may be configured at 402 in order to translate data received from one or more system components into 3D coordinates and send the 3D coordinates to the robot, and the local metrology device may be configured at 404 to adjust and/or realign the end effector based on the 3D coordinates received from the global metrology device.

Configuring the local metrology device at 404 may include positioning the robot on another automated guided vehicle (e.g., third automated guided vehicle 146 of FIG. 2), the automated guided vehicle being configured to move the robot with respect to the apparatus, the supply of parts, and/or the global metrology device. In these methods, configuring the global metrology device at 402 may include configuring the global metrology device to instruct movement of the automated guided vehicle with the robot positioned thereon in order to reposition the robot by virtue of instructing movement of an automated guided vehicle. Additionally or alternatively, configuring the local metrology device at 404 may include configuring the robot and/or the automated guided vehicle on which the robot is positioned to provide feedback (e.g., feedback 152 of FIG. 2) to the global metrology device, and configuring the global metrology device to receive the feedback from the robot and/or the automated guided vehicle on which the robot is positioned. In some methods 400, configuring the local metrology device at 404 may include configuring the local metrology device to instruct and cause translation and/or rotation of the end effector.

Enabling performance of a task at 406 may include positioning the supply of parts on an automated guided vehicle (e.g., fourth automated guided vehicle 148 of FIG. 2), the automated guided vehicle on which the supply of parts is positioned being configured to move the supply of parts with respect to the apparatus, the robot, and/or the global metrology device. In these methods, configuring the global metrology device at 402 may include configuring the global metrology device to instruct movement of the automated guided vehicle with the supply of parts positioned thereon in order to reposition the supply of parts by virtue of instructing movement of the automated guided vehicle on which the supply of parts is positioned. Additionally or alternatively, configuring the global metrology device at 402 may include configuring the supply of parts and/or the automated guided vehicle on which the supply of parts is positioned to provide feedback to the global metrology device, and configuring the global metrology device to receive the feedback from the supply of parts and/or the automated guided vehicle on which the supply of parts is positioned.

Similarly, enabling performance of a task at 406 may include positioning the apparatus on an automated guided vehicle (e.g., first automated guided vehicle 132 of FIG. 2), the automated guided vehicle on which the apparatus is positioned being configured to move the apparatus with respect to the supply of parts, the robot, and/or the global metrology device. In these methods, configuring the global metrology device at 402 may include configuring the global metrology device to instruct movement of the automated guided vehicle with the apparatus positioned thereon in order to reposition the apparatus by virtue of instructing movement of the automated guided vehicle on which the apparatus is positioned. Additionally or alternatively, configuring the global metrology device at 402 may include configuring the apparatus and/or the automated guided vehicle on which the apparatus is positioned to provide feedback to the global metrology device (e.g., feedback from active sensors onboard the apparatus and/or the automated guided vehicle on which the apparatus is positioned), and configuring the global metrology device to receive the feedback from the apparatus and/or the automated guided vehicle on which the apparatus is positioned.

Enabling performance of the task at 406 may include enabling performance of one or more of moving a part, moving the apparatus, moving the robot, moving the end effector, removing a respective part from the supply of parts and moving it to the apparatus, coupling a respective part from the supply of parts to the apparatus, installing a component on the apparatus, assembling two or more respective parts from the supply of parts, integrating systems, testing, machining, laying-up a composite material, painting, sealing, fabricating, quality assurance inspecting, verifying proper positioning, and validating that a task was performed correctly (e.g., the system may be configured to validate that a part is about to be placed correctly before actually placing the part on the apparatus).

Figure 5:
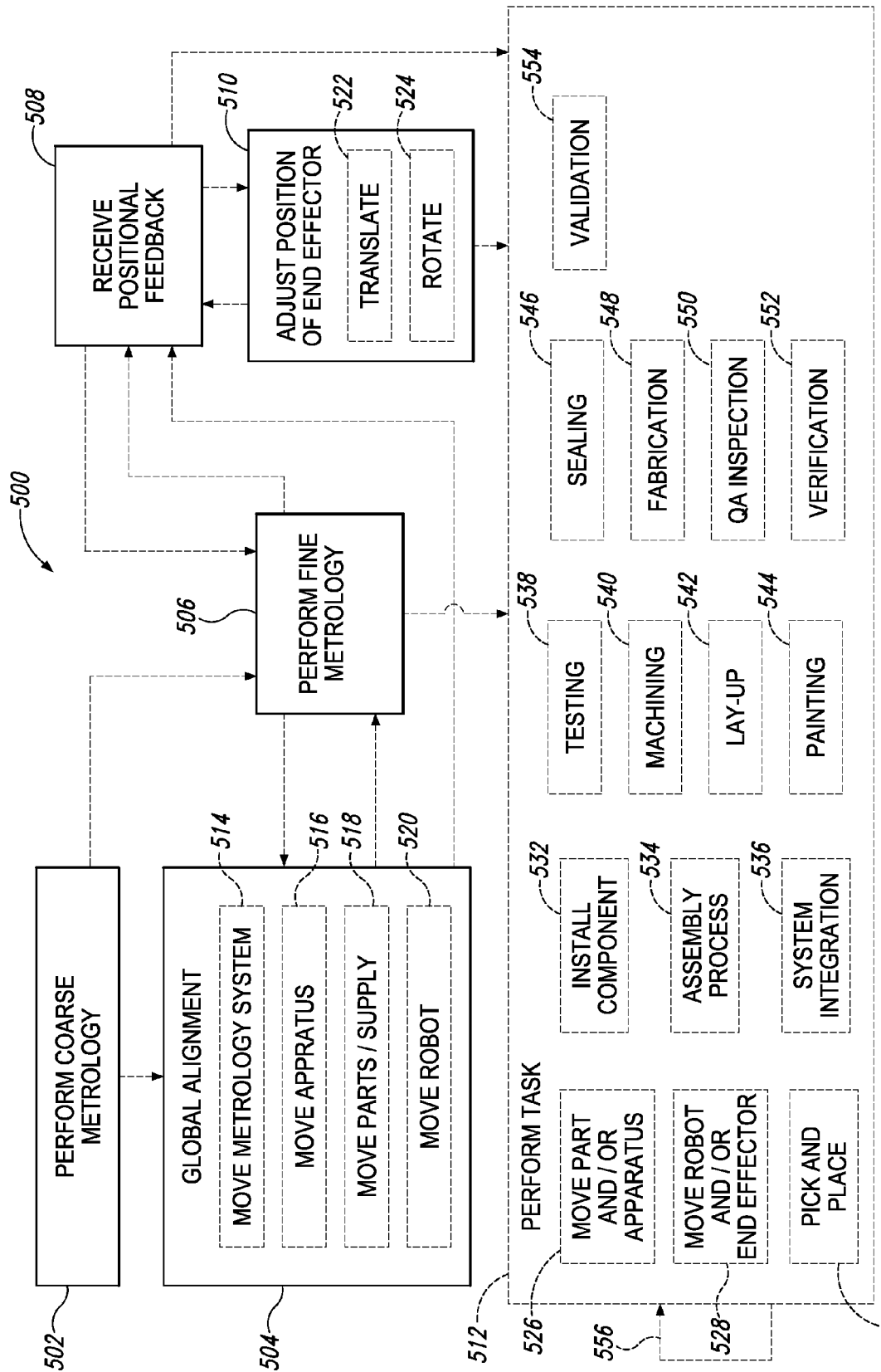
FIG. 5 is a schematic block diagram illustrating methods of performing a manufacturing process according to the present disclosure.
Figure 6:
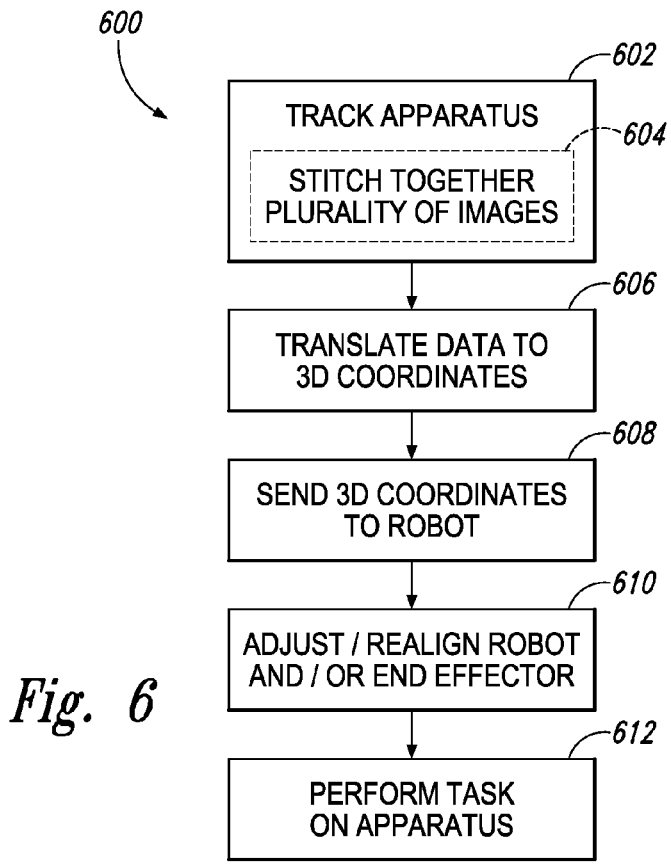
FIG. 6 is a schematic block diagram illustrating methods of performing a manufacturing process according to the present disclosure.
Figure 7:
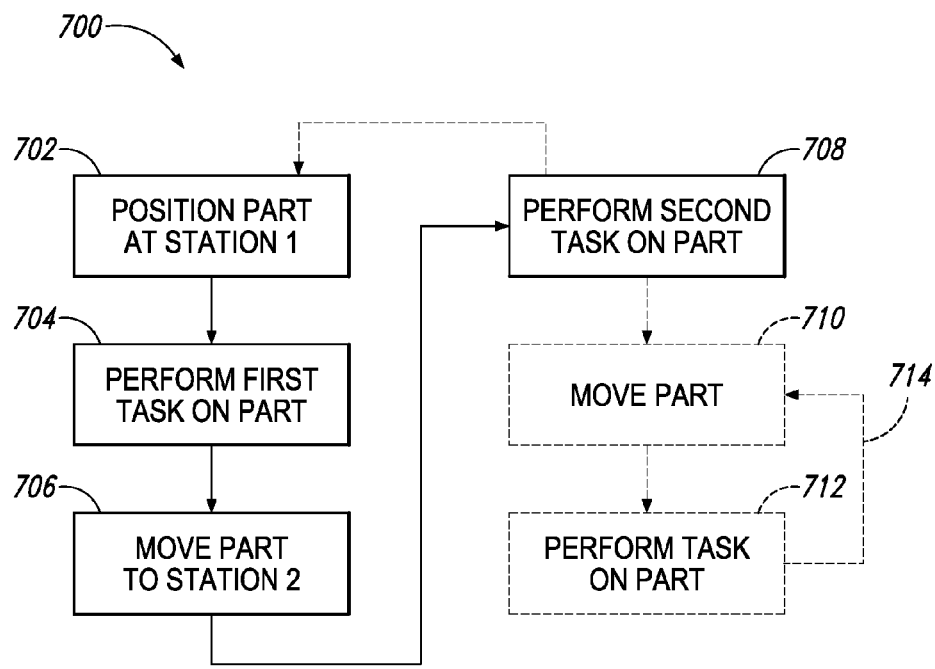
FIG. 7 is a schematic block diagram illustrating methods of performing a manufacturing process according to the present disclosure.

While methods 400 of FIG. 4 may be at least partially performed by a human operator or technician, methods 500, 600, 700 of FIGS. 5-7, respectively, may be at least partially performed autonomously, such as by presently disclosed manufacturing systems (e.g., system 122 of FIG. 2 and/or system 174 of FIG. 3).

FIG. 5 illustrates methods 500 of performing a manufacturing process, which may generally include performing coarse metrology at 502, performing global alignment at 504, performing fine metrology at 506, receiving positional feedback at 508 (e.g., closed loop feedback), adjusting and/or aligning the position of an end effector at 510, and performing a task on the apparatus at 512. Performing the fine metrology at 506 may be configured to supplement the performing the coarse metrology at 502 in order to dynamically adjust each system component (e.g., system components 150 of FIG. 2) with respect to one another in order to perform the task at 512.

Performing global alignment at 504 may include moving one or more system components, such as moving the global metrology system at 514, moving the apparatus at 516, moving the supply of parts at 518, and/or moving the robot at 520. For example, performing coarse metrology at 502 may include roughly tracking the respective positions of the system components (e.g., tracking the respective positions of the apparatus, the robot, and the supply of parts, and/or a respective automated guided vehicle on which each is positioned) using the vision system of the global metrology device, and performing global alignment at 504 may include moving one or more of the system components in response to alignment information from the global metrology device. For example, a communications device of the global metrology device may communicate alignment information with one or more of the system components in order to effectuate or instruct movement of one or more components with respect to one another. Such alignment at 504 may be performed to position the system components relatively with respect to one another, and/or may be performed to position one or more of the system components to a respective absolute position.

In some examples, performing fine metrology at 506 may be performed before and/or after receiving positional feedback at 508. For example, a processor of the robot may receive local alignment information from a local metrology device coupled to the robot and configured to track the position of the end effector and/or another system component. The position of the end effector may be adjusted and/or aligned with respect to one or more system components at 510, in response to the performing fine metrology at 506, the performing course metrology at 502, and/or the receiving positional feedback at 508. In some methods, adjusting and/or aligning the end effector at 510 may include translating the end effector at 522 and/or rotating the end effector at 524. The end effector may be configured to perform a task on the apparatus at 512, and may be removable from the robot, such that a different end effector configured to perform a different task may be coupled to the robot, thereby forming a robot capable of performing multiple different tasks on the apparatus.

Once the end effector of the robot is aligned within desired tolerances to the apparatus, the task may be performed one or more times at 512. For example, performing the task at 512 may include one or more of moving the part at 526, moving the apparatus at 526, moving the robot at 528, moving the end effector at 528, performing a pick and place operation at 530, installing a component on the apparatus at 532, performing an assembly process at 534, performing system integration at 536, testing at 538, machining at 540, laying-up a composite material at 542, painting at 544, sealing at 546, fabricating at 548, quality assurance inspecting at 550, verifying correct placement of a part at 552, and/or validation at 554. Performing the task at 512 may be repeated one or more times at 556, such as by repeating the same task a plurality of times and/or performing a plurality of different tasks.

FIG. 6 illustrates methods 600 of performing a task on an apparatus (e.g., apparatus 124 of FIG. 2) utilizing one or more presently disclosed manufacturing systems. The apparatus may be tracked at 602, such as by a global metrology device (e.g., global metrology device 126 of FIG. 2) having a vision system (e.g., global vision system 138 of FIG. 2). For example, the global metrology device may be configured to track one or more features or points of the geometry of the apparatus in order to roughly determine the position and/or orientation of the apparatus. In some methods 600, tracking the apparatus at 602 may include stitching together a plurality of images of the apparatus at 604 in order to determine the location of the apparatus or a portion thereof. Tracking the apparatus at 602 may result in a set of data stored, at least temporarily, by the global metrology device (e.g., by the processor 140 of global metrology device 126), said data representing the location of the apparatus. In some methods, the global metrology device may be configured to translate the data to three-dimensional (3D) coordinates at 606. For example, data collected from the vision system of the global metrology device may be used by the processor of the global metrology device to determine a matrix of values, each value representing a component of the position and/or orientation of the apparatus.

The 3D coordinates may be communicated to the robot (e.g., robot 128 of FIG. 2) at 608. For example, a communications device of the global metrology device (e.g., global communication system 142) may communicate the 3D coordinates to a local communications device on the robot (e.g., local communications device 170). In response to receiving the 3D coordinates of the apparatus, the robot may be pre-programmed to adjust, reposition, and/or realign the robot itself and/or an end effector of the robot (e.g., end effector 154 of FIG. 2) based on said 3D coordinates. In other words, once the robot receives new coordinate information from the global metrology device (e.g., via closed loop feedback) regarding the position of the apparatus, the robot may reposition itself in response thereto. Such repositioning may be repeated a plurality of times in response to a plurality of sets of new coordinates, and the coordinate information may be updated a plurality of times in some examples. The robot and/or end effector may be adjusted and realigned at 610, which may include using a local metrology device (e.g., local metrology device 160 of FIG. 2) to perform one or more fine adjustments on the position and/or orientation of the end effector. Thus, tracking the apparatus at 602, translating data to 3D coordinates at 606, sending the 3D coordinates to the robot at 608, and/or adjusting the robot and/or end effector at 610 may all be substeps of performing global metrology (e.g., may be substeps of performing coarse metrology at 502 in FIG. 5). Adjusting or realigning the robot and/or end effector at 610 also may be a substep of performing local metrology (e.g., a substep of performing local metrology at 506 in FIG. 5). Once positioned and aligned relative to the apparatus, the end effector may perform a task on the apparatus at 612. For example, performing a task on the apparatus at 612 may include one or more of the tasks of step 512 in FIG. 5. While the steps of FIG. 6 are described with respect to tracking the apparatus and positioning the robot with respect to the apparatus, additionally or alternatively, the same steps may be performed with respect to a supply of parts (e.g., the robot may receive 3D coordinates regarding the position and/or orientation of the supply of parts and the end effector may be positioned based on such 3D coordinates).

FIG. 7 illustrates methods 700 of performing a manufacturing process involving moving a part or apparatus to a plurality of different stations, where a different task may be performed on the part or apparatus at each respective station. Methods 700 may include positioning a part (e.g., apparatus 124 and/or part 158 of FIG. 2) at a first station (e.g., first station 180 of FIG. 3) at 702. Positioning the part at the first station at 702 may be performed manually, or, a first robot, such as a mobile robot or a robot positioned on an automated guided vehicle, may be used to place the part at or in the proximity of the first station. The first robot may be configured to utilize information about the position of the part from both a global metrology device and a first local metrology device coupled to the first robot. The global metrology device (e.g., global metrology device 126 of FIGS. 2-3) may be spaced apart from the first robot and configured to track the positions of the first robot, the part, and the first station. The first local metrology device (which may be an example of local metrology device 160 of FIG. 2) may be configured to track the position of a first end effector (which may be an example of end effector 154 of FIG. 2) coupled to the first robot. The global metrology device and first local metrology device may be configured to work together to place the part at or near the first station.

Each of the stations may include a task robot positioned at the station, each of the task robots configured to perform a different task on the part. For example, a second robot having a second end effector may be positioned at the first station and configured to perform a first task on the part at 704, once the part is positioned at the first station. In order to perform the first task on the part at 704, the second robot may be configured to utilize information about the position of the part from both the global metrology device (which also may be configured to track the position of the second robot) and a second local metrology device coupled to the second robot. The global metrology device also may be spaced apart from the second robot, and may, along with the second local metrology device, be configured to track the position of the second end effector and part, in order to align the two together.

The part may be moved to a second station (e.g., second station 182 of FIG. 3) at 706, such as by using the first robot to move the part from the first station to the second station. The second station may include a third robot having a third end effector and third local metrology device, which may be configured to perform a second task on the part at 708. The global metrology device also may be spaced apart from the third robot and configured to track the position of the third robot, while the third local metrology device may be coupled to the third robot and configured to track the position of the part and the third end effector. The global metrology device and the third local metrology device may be configured to work together to align the part and the third end effector with respect to one another so that a second task may be performed on the part at 708.

Generally, the performing the first task at 704 may be performed after the positioning the part at the first station at 702, the moving the part to the second station at 706 may be performed after the performing the first task at 704, and the performing the second task at 708 may be performed after the moving the part to the second station at 706. In some methods, the part may be removed from the second station after performing the second task at 708, and moved to another respective station at 710. Once positioned and aligned, another respective task may be performed on the part at 712. Such steps may be repeated at 714 any number of times (e.g., any number of stations may be included to perform any number of tasks on the part in methods 700). The part thus may be moved to a plurality of different stations, where a respective task of a plurality of tasks may be performed on the part at each respective station. In some methods, each respective task may be performed on a plurality of parts at each respective station. For example, in some methods, the part is a first part, and once the first part is moved away from the first station at 706, a second part may be placed at the first station, where the first task may be performed on the second part. Similarly, once the first part has been moved away from the second station after the second task has been performed on the first part, the second part may be moved to the second station, and the second task may be performed on the second part. Such methods may be repeated any number of times on any number of parts, each of which may be the same part or different parts. The performing the first task at 704, the performing the second task at 708, and/or the performing the other task(s) at 712 may be examples of performing a task 512 from FIG. 5.

Figure 8:
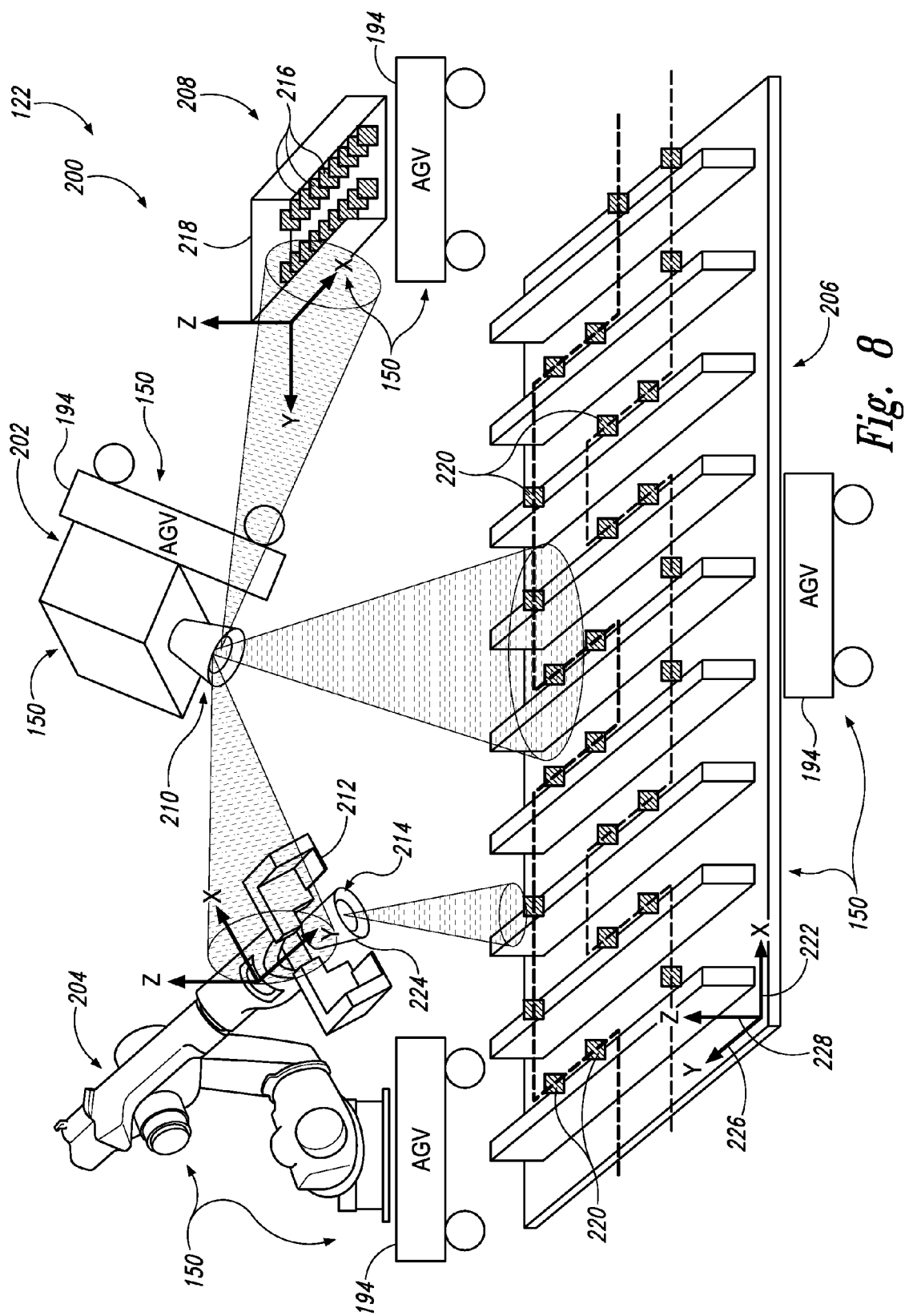
FIG. 8 is a schematic representation of illustrative, non-exclusive examples of automated, dynamic systems for performing a manufacturing task, according to the present disclosure.

Turning now to FIG. 8, an illustrative non-exclusive example of a manufacturing system 122 in the form of manufacturing system 200 is illustrated. Where appropriate, the reference numerals from the schematic illustrations of FIGS. 2-3 are used to designate corresponding parts of manufacturing system 200; however, the example of FIG. 8 is non-exclusive and does not limit manufacturing systems 122 to the illustrated embodiment of FIG. 8. That is, manufacturing systems 122 are not limited to the specific embodiment of the illustrated manufacturing system 200, and manufacturing system 200 may incorporate any number of the various aspects, configurations, characteristics, properties, etc. of manufacturing systems 122 that are illustrated in and discussed with reference to the schematic representations of FIGS. 2-3, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to manufacturing system 200; however, it is within the scope of the present disclosure that the previously discussed features, variants, etc. may be utilized with manufacturing system 200.

Manufacturing system 200 may include a global metrology device 202 (which may be an example of global metrology device 126), a robot 204 (which may be an example of robot 128), an apparatus 206 (which may be an example of apparatus 124), and a supply of parts 208 (which may be an example of supply of parts 130). One or more of global metrology device 202, robot 204, apparatus 206, and supply of parts 208 may be positioned on one or more respective automated guided vehicles 194, each of which may be configured to move global metrology device 202, robot 204, apparatus 206, or supply of parts 208, respectively, with respect to the others of global metrology device 202, robot 204, apparatus 206, and supply of parts 208. Global metrology device 202 may be configured to track the positions of robot 204, apparatus 206, and supply of parts 208 using a global vision system 210, which may be an example of vision system 138. Robot 204 may include an end effector 212 (which may be an example of end effector 154) and a local metrology device 214 (which may be an example of local metrology device 160). Local metrology device 214 may be configured to track the position of end effector 212 with respect to apparatus 206 and/or parts 216 (which may be an example of parts 158) which may be in a container 218 (which may be an example of container 172) of supply of parts 208.

System 200 may be configured to perform a manufacturing process, such as a "pick and place" operation, where a respective part 216 is removed from supply of parts 208 (e.g., "picked") and then moved towards and placed on apparatus 206. FIG. 8 illustrates a plurality of parts 216 remaining in container 218, as well as a plurality of placed parts 220 that have already been moved from supply of parts 208 and placed on apparatus 206. Global metrology device 202 and local metrology device 214 on robot 204 may supplement one another and communicate data regarding positions of other system components in order to effectuate aligning end effector 212 of robot 204 in order to accurately remove a respective part 216 from container 218, move the part adjacent apparatus 206, and place the part on apparatus 206 (e.g., couple part 216 to apparatus 206 to create a respective placed part 220).

Each system component 150 may be movable with respect to the other system components 150, by virtue of being positioned on a respective automated guided vehicle 194. In other examples, only some of system components 150 may be movable, while others may be stationary. System components 150 may be movable in a plurality of different directions. For example, apparatus 206 may be moveable in at least two different directions with respect to robot 204, global metrology device 202, and/or supply of parts 208. In some examples, apparatus 206 may be moveable in at least three different perpendicular directions with respect to robot 204, global metrology device 202, and/or supply of parts 208. In some examples, apparatus 206 may be configured to rotate with respect to robot 204, global metrology device 202, and/or supply of parts 208. For example, apparatus 206 may be moveable back and forth in a first direction along X-axis 222, back and forth in a second direction along Y-axis 226, and/or moveable vertically along Z-axis 228. X-axis 222, Y-axis 226, and Z-axis 228 may be perpendicular and orthogonal to one another. Each of global metrology device 202, robot 204, and/or supply of parts 208 may be similarly moveable on an automated guided vehicle 194 with respect to the others of the respective system components 150. End effector 212 may have additional degrees of freedom. For example, end effector 212 may be additionally rotatable about each of the X, Y, and Z axes in some examples. Any or all system components 150 may be fully autonomous in terms of positioning, alignment, and/or task performance.

Global metrology device 202 and local metrology device 214 may each be configured to provide real-time metrology (e.g., data regarding position and/or orientation of one or more system components 150). Global metrology device 202 and local metrology device 214 each may be configured to receive and/or send continuous feedback based on the actual positions of one or more of the system components 150. For example, global metrology device 202 may include vision system 210, which may include, for example, one or more cameras configured to detect the physical geometry and locations of robot 204, apparatus 206, and supply of parts 208. Similarly, local metrology device 214 may include a local vision system 224 that may include one or more cameras configured to detect the physical geometry and locations of apparatus 206, end effector 212, and supply of parts 208. Additionally or alternatively, global metrology device 202 and/or local metrology device 214 may be configured to track positions and/or orientations of other parts, tools, tool change racks, sub-assemblies, and/or any other device or structure used in or related to the given task or manufacturing process.

In some examples, global metrology device 202 and/or local metrology device 214 may include respective pre-programmed limits concerning range of positions and/or orientations for one or more system components 150. For example, global metrology device 202 may include a processor having stored, predetermined global limits for the positions of robot 204, apparatus 206, and/or supply of parts 208 such that global metrology device 202 is configured to instruct each respective system component 150 to stay within the respective global predetermined limits for each component. Similarly, local metrology device 214 may include a processor having stored, predetermined local limits for the position and/or orientation of end effector 212, such that end effector 212 may not be moved outside the range of said predetermined local limits. Such predetermined global and local limits may be customized in order to prevent damage to one or more system components 150 (e.g., a global limit may be set that would prevent global metrology device 202 from instructing apparatus 206 to move such that it would impact a wall or other fixed structure in the work environment).

Local metrology device 214 may receive information from global metrology device 202 and may update the location of end effector 212 and continue with a task or manufacturing process after incrementally repositioning or realigning end effector 212 with respect to apparatus 206 and/or supply of parts 208. System 200 may be configured to repeatedly send and/or receive feedback and update positioning of end effector 212 based on the feedback and continuous updates. Thus, system 200 may include dynamic system components 150, and dynamic, continuous feedback to and from one or more system components 150. Such systems may enable real-time inspection as a part is being placed or assembled, to verify that the part is being placed and/or assembled correctly. Such systems 200 may thereby reduce or eliminate rework, as compared to conventional manufacturing methods and systems.

Illustrative, non-exclusive examples of inventive subject matter according to the present disclosure are described in the following enumerated paragraphs:

A1. A system for performing a task on an apparatus, the system comprising:
the apparatus;
a supply of parts located apart from the apparatus;
a robot having an end effector, wherein the end effector is configured to perform the task on the apparatus using one or more of the parts, the robot comprising a local metrology device configured to position the end effector with respect to the apparatus; and
a global metrology device configured to track the positions of the apparatus, the robot, and the supply of parts.

A2. The system of paragraph A1, wherein the apparatus is positioned on a first automated guided vehicle configured to move the apparatus with respect to one or more of the supply of parts, the robot, and the global metrology device.

A2.1. The system of paragraph A2, wherein the first automated guided vehicle is configured to translate the apparatus in at least two directions with respect to one or more of the supply of parts, the robot, and the global metrology device.

A2.2. The system of paragraph A2 or A2.1, wherein the first automated guided vehicle is configured to move the apparatus in at least three different perpendicular directions with respect to one or more of the supply of parts, the robot, and the global metrology device.

A2.3. The system of any of paragraphs A2-A2.2, wherein the first automated guided vehicle is configured to rotate the apparatus with respect to one or more of the supply of parts, the robot, and the global metrology device.

A3. The system of any of paragraphs A1-A2.3, wherein the global metrology device is positioned on a second automated guided vehicle configured to move the global metrology device with respect to one or more of the apparatus, the robot, and the supply of parts.

A3.1. The system of paragraph A3, wherein the second automated guided vehicle is configured to translate the global metrology device in at least two directions with respect to one or more of the apparatus, the robot, and the supply of parts.

A3.2. The system of paragraph A3 or A3.1, wherein the second automated guided vehicle is configured to move the global metrology device in at least three different perpendicular directions with respect to one or more of the apparatus, the robot, and the supply of parts.

A3.3. The system of any of paragraphs A3-A3.2, wherein the second automated guided vehicle is configured to rotate the global metrology device with respect to one or more of the apparatus, the robot, and the supply of parts.

A4. The system of any of paragraphs A1-A3.3, wherein the robot is positioned on a third automated guided vehicle configured to move the robot with respect to one or more of the apparatus, the supply of parts, and the global metrology device.

A4.1. The system of paragraph A4, wherein the third automated guided vehicle is configured to translate the robot in at least two directions with respect to one or more of the supply of parts, the apparatus, and the global metrology device.

A4.2. The system of paragraph A4 or A4.1, wherein the third automated guided vehicle is configured to move the robot in at least three different perpendicular directions with respect to one or more of the apparatus, the supply of parts, and the global metrology device.

A4.3. The system of any of paragraphs A4-A4.2, wherein the third automated guided vehicle is configured to rotate the robot with respect to one or more of the supply of parts, the apparatus, and the global metrology device.

A5. The system of any of paragraphs A1-A4.3, wherein the supply of parts is positioned on a fourth automated guided vehicle configured to move the supply of parts with respect to one or more of the apparatus, the robot, and the global metrology device.

A5.1. The system of paragraph A5, wherein the fourth automated guided vehicle is configured to translate the supply of parts in at least two directions with respect to one or more of the global metrology device, the robot, and the apparatus.

A5.2. The system of paragraph A5 or A5.1, wherein the fourth automated guided vehicle is configured to move the supply of parts in at least three different perpendicular directions with respect to one or more of the apparatus, the robot, and the global metrology device.

A5.3. The system of any of paragraphs A5-A5.2, wherein the fourth automated guided vehicle is configured to rotate the supply of parts with respect to one or more of the global metrology device, the robot, and the apparatus.

A6. The system of any of paragraphs A1-A5.3, wherein the global metrology device comprises a vision system configured to track the apparatus, the robot, and the supply of parts.

A7. The system of any of paragraphs A1-A6, wherein the global metrology device comprises a processor configured to translate information from tracking the positions of the apparatus, the robot, and/or the supply of parts into first instructions for moving the apparatus, second instructions for moving the robot, and/or third instructions for moving the supply of parts.

A8. The system of any of paragraphs A1-A7, wherein the global metrology device comprises a communications device configured to communicate with the apparatus, the robot, the supply of parts, a/the first automated guided vehicle on which the apparatus is positioned, a/the second automated guided vehicle on which the global metrology device is positioned, a/the third automated guided vehicle on which the robot is positioned, and/or a/the fourth automated guided vehicle on which the supply of parts is positioned.

A9. The system of paragraphs A7 and A8, wherein the communications device is configured to communicate to the first automated guided vehicle the first instructions for moving the apparatus, is configured to communicate to the third automated guided vehicle the second instructions for moving the robot, and/or is configured to communicate to the fourth automated guided vehicle the third instructions for moving the supply of parts.

A10. The system of paragraph A8 or A9, wherein the communications device is configured to receive feedback regarding the positions of the apparatus, the robot, and/or the supply of parts.

A11. The system of any of paragraphs A1-A10, wherein the apparatus comprises a component, system, subsystem, part, and/or structure of an aircraft.

A11.1. The system of paragraph A11, wherein the apparatus comprises one or more of a wing and a fuselage.

A12. The system of any of paragraphs A1-A11.1, wherein the apparatus comprises an aircraft.

A13. The system of any of paragraphs A1-A12, wherein the apparatus comprises a passenger aircraft.

A14. The system of any of paragraphs A1-A13, wherein the robot comprises a local communications device configured to receive instructions from the global metrology device and provide feedback to the global metrology device regarding the position of the robot.

A15. The system of any of paragraphs A1-A14, wherein the robot comprises a tool coupled to the end effector, wherein the tool is configured to perform the task on the apparatus and/or one of the parts of the supply of parts, and optionally wherein the tool is selectively removable from the end effector.

A15.1. The system of paragraph A15, wherein the local metrology device is coupled to the tool.

A16. The system of any of paragraphs A1-A15.1, wherein the local metrology device is configured to supplement the global metrology device.

A17. The system of any of paragraphs A1-A16, wherein the local metrology device is configured to position the end effector within a tolerance of 0.1 inches (2.5 mm).

A18. The system of any of paragraphs A1-A17, wherein the local metrology device is configured to position the end effector within a tolerance of 0.01 inches (0.25 mm).

A19. The system of any of paragraphs A1-A18, wherein the local metrology device is configured to position the end effector within a tolerance of 0.001 inches (0.025 mm).

A20. The system of any of paragraphs A1-A19, wherein the local metrology device is proximal to, and optionally coupled to, the end effector.

A21. The system of any of paragraphs A1-A20, wherein the local metrology device is configured to supplement the global metrology device in order to improve positioning accuracy of the end effector.

A21.1. The system of any of paragraphs A1-A21, wherein the local metrology device is configured to perform positioning at a higher resolution than the global metrology device.

A21.2. The system of paragraph A21.1, wherein the local metrology device is configured to perform positioning with at least ten times the resolution of the global metrology device.

A22. The system of any of paragraphs A1-A21.2, wherein the local metrology device includes one or more of a camera, a vision system, and a laser device.

A23. The system of any of paragraphs A1-A22, wherein the end effector of the robot is configured to move at least one of the parts from the supply of parts to the apparatus.

A24. The system of any of paragraphs A1-A23, wherein the end effector of the robot is configured to couple at least one of the parts from the supply of parts onto the apparatus.

A25. The system of any of paragraphs A1-A24, wherein the end effector of the robot is configured to perform one or more of installing one or more of the parts from the supply of parts on the apparatus, an assembly process, system integration, testing, machining, a lay-up process, painting, sealing, fabrication, quality assurance inspection, validation, and verification.

A26. The system of any of paragraphs A1-A25, wherein the global metrology device is configured to use one or more of stationary fiducial targeting, active LED fiducial targeting, and optical data to track the positions of the robot, the apparatus, and the supply of parts.

A27. The system of any of paragraphs A1-A26, wherein the robot is configured to repeatedly move a plurality of respective parts, one at a time, from the supply of parts to the apparatus.

A28. The system of paragraph A27, wherein a/the third automated guided vehicle is configured to move the robot between moving subsequent respective parts from the supply of parts.

A29. The system of paragraph A27 or A28, wherein a/the local metrology device of the robot is configured to adjust a position of the end effector between moving subsequent respective parts from the supply of parts.

A30. The system of any of paragraphs A1-A29, wherein the robot is configured to perform a plurality of different tasks on the apparatus and/or parts of the supply of parts.

A31. The system of any of paragraphs A1-A30, wherein the end effector of the robot is configured to be coupled to any of a plurality of different tools, each of the plurality of different tools being configured to perform a different respective task.

B1. A system for performing a manufacturing process, the system comprising:
a part;
a robot configured to move the part and/or perform a task on the part using an end effector coupled to the robot, the robot comprising a local metrology device configured to track and position the end effector;
a plurality of stations including at least a first station and a second station, each of the plurality of stations being configured to perform a different task on the part; and
a global metrology device configured to track the positions of the part, the robot, and each of the plurality of stations, wherein the robot is configured to move the part sequentially to each of the plurality of stations in order to complete the manufacturing process.

B2. The system of paragraph B1, wherein each of the plurality of stations comprises a respective task robot configured to perform a different task on the part.

B3. The system of any of paragraphs B1-B2, wherein one or more of the part, the robot, and the global metrology device is positioned on a respective automated guided vehicle, each respective automated guided vehicle being configured to move the part, the robot, or the global metrology device, respectively, with respect to the others of the part, the robot, and the global metrology device.

B4. The system of any of paragraphs B1-B3, wherein the global metrology device comprises one or more of a vision system configured to provide information regarding the positions of the robot, the part, and the plurality of stations, a processor configured to process the information from the vision system, and a communications device configured to send and/or receive data to and/or from the robot.

B5. The system of any of paragraphs B1-B4, wherein the part comprises one or more of a system, subsystem, component, and/or structure of an aircraft.

B6. The system of any of paragraphs B1-B5, wherein the robot comprises a local metrology device configured to track and position the end effector of the robot.

B7. The system of paragraph B6, wherein the local metrology device is configured to provide higher resolution positioning than the global metrology device.

B8. The system of paragraph B6 or B7 wherein the local metrology device is coupled to a tool, the tool being coupled to the end effector and configured to perform the task on the part.

B9. The system of any of paragraphs B6-B8, wherein the local metrology device comprises one or more of a vision system, a camera, and a laser device.

B10. The system of any of paragraphs B6-B9, wherein the local metrology device is configured to provide feedback to a robot processor concerning the location of the end effector, and the robot processor is configured to effectuate movement of the end effector in response to the feedback.

B11. The system of any of paragraphs B6-B10, wherein the local metrology device is configured to position the end effector within a tolerance of 0.1 inches (2.5 mm).

B12. The system of any of paragraphs B6-B11, wherein the local metrology device is configured to position the end effector within a tolerance of 0.01 inches (0.25 mm).

B13. The system of any of paragraphs B6-B12, wherein the local metrology device is configured to position the end effector within a tolerance of 0.001 inches (0.025 mm).

B14. The system of any of paragraphs B1-B13, wherein the robot comprises a local communications device configured to receive information from the global metrology device regarding the positions of the part and one or more of the plurality of stations.

B15. The system of any of paragraphs B1-B14, wherein the end effector of the robot is configured to perform one or more of installing a final part resulting from the manufacturing process on an apparatus, an assembly process, system integration, testing, machining, a lay-up process, painting, sealing, fabrication, quality assurance inspection, validation, and verification.

B16. The system of any of paragraphs B1-B15, wherein the global metrology device is configured to use one or more of stationary fiducial targeting, active LED fiducial targeting, and optical data to track the positions of the robot, the part, and the plurality of stations.

B17. The system of any of paragraphs B1-B16, wherein the local metrology device is configured to use one or more of stationary fiducial targeting, active LED fiducial targeting, and optical data to track the positions of the robot, the part, the plurality of stations, the end effector, and/or the global metrology device.

C1. Use of the system of any of paragraphs A1-A31 to perform a manufacturing process.

D1. Use of the system of any of paragraphs B1-B17 to perform a manufacturing process.

E1. An aircraft manufactured using the system of any of paragraphs A1-A31 or B1-B17.

F1. A method of performing a manufacturing process using a system, the method comprising:
configuring a global metrology device of the system to perform global alignment of an apparatus, a robot, and a supply of parts using the global metrology device, the global metrology device being configured to track the positions of the apparatus, the robot, and the supply of parts, and the global metrology device being further configured to instruct and cause movement of the apparatus, the robot, and/or the supply of parts with respect to the global metrology device;
configuring a local metrology device of the system to perform local alignment of an end effector of the robot with respect to the apparatus using the local metrology device, the local metrology device being coupled to the robot; and enabling performance of a task on or to the apparatus, such that the end effector of the robot and a part from the supply of parts are used in performance of the task.

F2. The method of paragraph F1, wherein the enabling performance of the task on or to the apparatus comprises enabling the robot to perform the task autonomously.

F3. The method of any of paragraphs F1-F2, further comprising positioning the apparatus on a first automated guided vehicle, the first automated guided vehicle being configured to move the apparatus with respect to the robot, the supply of parts, and/or the global metrology device.

F3.1. The method of paragraph F3, wherein the configuring the global metrology device to perform global alignment comprises configuring the global metrology device to instruct movement of the first automated guided vehicle with the apparatus positioned thereon.

F4. The method of any of paragraphs F1-F3.1, further comprising positioning the global metrology device on a second automated guided vehicle, the second automated guided vehicle being configured to move the global metrology device with respect to the apparatus, the supply of parts, and/or the robot.

F4.1. The method of paragraph F4, wherein the configuring the global metrology device to perform global alignment comprises configuring the global metrology device to instruct movement of the second automated guided vehicle with the global metrology device positioned thereon.

F5. The method of any of paragraphs F1-F4.1, further comprising positioning the robot on a third automated guided vehicle, the third automated guided vehicle being configured to move the robot with respect to the apparatus, the supply of parts, and/or the global metrology device.

F5.1. The method of paragraph F5, wherein the configuring the global metrology device to perform global alignment comprises configuring the global metrology device to instruct movement of the third automated guided vehicle with the robot positioned thereon.

F6. The method of any of paragraphs F1-F5.1, further comprising positioning the supply of parts on a fourth automated guided vehicle, the fourth automated guided vehicle being configured to move the supply of parts with respect to the apparatus, the robot, and/or the global metrology device.

F6.1. The method of paragraph F6, wherein the configuring the global metrology device to perform global alignment comprises configuring the global metrology device to instruct movement of the fourth automated guided vehicle with the supply of parts positioned thereon.

F7. The method of any of paragraphs F1-F6.1, further comprising configuring the robot and/or a/the third automated guided vehicle on which the robot is positioned to provide feedback to the global metrology device, and configuring the global metrology device to receive the feedback from the robot and/or the third automated guided vehicle.

F8. The method of any of paragraphs F1-F7, further comprising configuring the supply of parts and/or a/the fourth automated guided vehicle on which the supply of parts is positioned to provide feedback to the global metrology device, and configuring the global metrology device to receive the feedback from the supply of parts and/or the fourth automated guided vehicle.

F9. The method of any of paragraphs F1-F8, further comprising configuring the apparatus and/or a/the first automated guided vehicle on which the apparatus is positioned to provide feedback to the global metrology device, and configuring the global metrology device to receive the feedback from the apparatus and/or the first automated guided vehicle.

F10. The method of any of paragraphs F1-F9, wherein the configuring the local metrology device to perform local alignment comprises configuring the local metrology device to instruct and cause translation of the end effector.

F11. The method of any of paragraphs F1-F10, wherein the configuring the local metrology device to perform local alignment comprises configuring the local metrology device to instruct and cause rotation of the end effector.

F12. The method of any of paragraphs F1-F11, wherein the configuring the global metrology device comprises configuring the global metrology device to adjust positions of the global metrology device, the robot, the supply of parts, and/or the apparatus autonomously, in order to enable alignment of the end effector in order to adequately perform a task.

F13. The method of any of paragraphs F1-F12, wherein the configuring the global metrology device comprises configuring the global metrology device to track the apparatus.

F14. The method of any of paragraphs F1-F13, wherein the configuring the global metrology device comprises configuring the global metrology device to compile together a plurality of images of the apparatus in order to determine a position of the apparatus.

F15. The method of any of paragraphs F1-F14, wherein the configuring the global metrology device comprises configuring the global metrology device to translate received data into 3D coordinates.

F16. The method of paragraph F15, further comprising configuring the global metrology device to send the 3D coordinates to the robot.

F17. The method of paragraph F16, further comprising configuring the robot to adjust and/or realign the end effector based on the 3D coordinates.

F18. The method of any of paragraphs F1-F17, wherein the enabling performance of the task comprises enabling performance of one or more of moving a part, moving the apparatus, moving the robot, moving the end effector, removing a respective part from the supply of parts and moving it to the apparatus, coupling a respective part from the supply of parts to the apparatus, installing a component on the apparatus, assembling two or more respective parts from the supply of parts, integrating systems, testing, machining, laying-up a composite material, painting, sealing, fabricating, quality assurance inspecting, verifying proper positioning, and validating that a task was performed correctly.

F19. The method of any of paragraphs F1-F18, wherein the system is the system of any of paragraphs A1-A31.

F20. The method of any of paragraphs F1-F19, wherein the system is the system of any of paragraphs B1-B17.

G1. A method of performing a manufacturing process, the method comprising:

positioning a part at a first station using a first robot, wherein the first robot utilizes information about the position of the part from both a global metrology device and a first local metrology device, the global metrology device being spaced apart from the first robot and configured to track the positions of the first robot, the part, and the first station, and the first local metrology device being coupled to the first robot and configured to track the position of a first end effector coupled to the first robot, wherein the global metrology device and the first local metrology device are configured to align the part and the first end effector with respect to one another;

performing a first task on the part at the first station using a second end effector of a second robot, wherein the second robot utilizes information about the position of the part from both the global metrology device and a second local metrology device, the global metrology device being spaced apart from the second robot and additionally configured to track the position of the second robot, and the second local metrology device being coupled to the second robot and configured to track the position of the second end effector coupled to the second robot, wherein the global metrology device and the second local metrology device are configured to align the part and the second end effector with respect to one another;

moving the part to a second station using the first robot; and performing a second task on the part at the second station using a third end effector of a third robot, wherein the third robot utilizes information about the position of the part from both the global metrology device and a third local metrology device, the global metrology device being spaced apart from the third robot and additionally configured to track the position of the third robot, and the third local metrology device being coupled to the third robot and configured to track the position of the third end effector coupled to the third robot, wherein the global metrology device and the third local metrology device are configured to align the part and the third end effector with respect to one another.

G1.1. The method of paragraph G1, wherein the performing the first task is performed after the positioning the part at the first station, wherein the moving the part to the second station is performed after the performing the first task, and wherein the performing the second task is performed after the moving the part to the second station.

G1.2. The method of paragraph G1 or G1.1, further comprising removing the part from the second station after performing the second task.

G1.3. The method of any of paragraphs G1-G1.2, further comprising positioning the part at a plurality of additional stations, performing a respective additional task at each respective additional station, and moving the part to a different respective station of the plurality of additional stations after performing each respective additional task.

G2. The method of any of paragraphs G1-G1.3, further comprising moving the part to a third station and performing a third task on the part at the third station.

G3. The method of any of paragraph G1-G2, wherein the part is a first part, the method further comprising positioning a second part at the first station, performing the first task on the second part at the first station, moving the second part to the second station, and performing the second task on the second part at the second station.

G4. The method of paragraph G3, wherein the positioning the second part at the first station is performed after the performing the first task on the first part and after the moving the first part to the second station.

G5. The method of paragraph G3 or G4, further comprising removing the first part from the second station, wherein the moving the second part to the second station is performed after the performing the first task on the second part at the first station, after the performing the second task on the first part at the second station, and after the removing the first part from the second station.

G6. The method of any of paragraphs G1-G5, wherein one or more of the positioning the part at the first station, the performing the first task on the part at the first station, moving the part to the second station and the performing the second task on the part at the second station is performed using the system of any of paragraphs A1-A31.

G7. The method of any of paragraphs G1-G6, wherein one or more of the positioning the part at the first station, the performing the first task on the part at the first station, the moving the part to the second station and the performing the second task on the part at the second station is performed using the system of any of paragraphs B1-B17.

G8. The method of any of paragraphs G1-G7, wherein the performing the first task comprises one or more of installing a component on the part, assembling, system integrating, testing, machining, laying-up, painting, sealing, fabricating, quality assurance inspecting, verifying, and validation of positioning.

G9. The method of any of paragraphs G1-G8, wherein the performing the second task comprises one or more of installing a component on the part, assembling, system integrating, testing, machining, laying-up, painting, sealing, fabricating, quality assurance inspecting, verifying, and validation of positioning.

G10. The method of any of paragraphs G1-G9, wherein the part is a first part, and further wherein the method includes repeating the method on a plurality of parts.

H1. A method of performing a manufacturing process, the method comprising:

receiving rough alignment information from a global metrology device, the global metrology device being configured to track a respective position of each of an apparatus, a robot, and a supply of parts;

performing global alignment of the apparatus, the robot, and the supply of parts;

receiving local alignment information from a local metrology device coupled to the robot; and performing fine alignment of an end effector coupled to the robot, the end effector being configured to perform a first task on the apparatus.

H2. The method of paragraph H1, wherein the end effector is a first end effector, and further wherein the method further comprises removing the first end effector from the robot and coupling a second end effector to the robot, wherein the second end effector is configured to perform a second task on the apparatus, the second task being different from the first task.

H3. The method of any of paragraphs H1-H2, wherein the performing global alignment comprises performing global alignment to a first resolution, and wherein the performing fine alignment comprises performing fine alignment to a second resolution, the second resolution being greater than the first resolution.

H4. The method of paragraph H3, wherein the second resolution is at least ten times greater than the first resolution.

H5. The method of any of paragraphs H1-H4, wherein the performing global alignment of the apparatus, the robot, and the supply of parts comprises roughly positioning the apparatus, the robot, and/or the supply of parts, respectively, relative to the others of the apparatus, the robot, and the supply of parts.

H6. The method of any of paragraphs H1-H5, wherein the performing global alignment of the apparatus, the robot, and the supply of parts comprises roughly positioning the apparatus, the robot, and/or the supply of parts, to a respective absolute position.

I1. An aircraft manufactured using the method of any of paragraphs F1-F20, G1-G10, and/or H1-H7.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

The various disclosed elements of apparatuses and systems and steps of methods disclosed herein are not required to all apparatuses, systems and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus, system, or method. Accordingly, such inventive subject matter is not required to be associated with the specific apparatuses, systems, and methods that are expressly disclosed herein, and such inventive subject matter may find utility in apparatuses, systems, and/or methods that are not expressly disclosed herein.

The invention claimed is:

1. A system for performing a task on an apparatus, the system comprising:
   the apparatus;
   a supply of parts comprising a plurality of parts located apart from the apparatus;
   a robot having an end effector, wherein the robot is configured to obtain one or more of the plurality of parts from the supply of parts, and wherein the end effector is configured to perform the task on the apparatus using the one or more of the plurality of parts, the robot comprising a local metrology device configured to position the end effector with respect to the apparatus using a local vision system, such that the end effector is aligned with the apparatus sufficiently to perform the task;
   a global metrology device configured to track positions of the apparatus, the robot, and the supply of parts with respect to one another using a global vision system, wherein the global metrology device is configured to communicate data to the robot about the positions of the apparatus and the supply of parts, and wherein the global metrology device is configured to receive feedback regarding actual positions of the robot, the apparatus, and the supply of parts, and wherein the local metrology device is configured to supplement the global metrology device in positioning the end effector; and
   a first automated guided vehicle on which the robot is positioned, the first automated guided vehicle being configured to move the robot with respect to one or more of the apparatus, the supply of parts, and the global metrology device.

2. The system according to claim 1, further comprising a second automated guided vehicle on which the apparatus is positioned, the second automated guided vehicle being configured to move the apparatus with respect to the supply of parts, the robot, and the global metrology device.

3. The system according to claim 1, wherein the global metrology device is positioned on a second automated guided vehicle configured to move the global metrology device with respect to one or more of the apparatus, the robot, and the supply of parts.

4. The system according to claim 1, wherein the supply of parts is positioned on a second automated guided vehicle configured to move the supply of parts with respect to one or more of the apparatus, the robot, and the global metrology device.

5. The system according to claim 1, wherein the global metrology device comprises a processor configured to translate information from tracking the positions of the apparatus, the robot, and the supply of parts into first instructions for moving the apparatus, second instructions for moving the robot, and third instructions for moving the supply of parts, wherein the global metrology device comprises a communications device configured to communicate the first instructions, the second instructions, and the third instructions, thereby effectuating movement and global alignment of the apparatus, the robot, and the supply of parts.

6. The system according to claim 1, wherein the apparatus comprises one or more of a component, a system, a subsystem, a part, and a structure of an aircraft.

7. The system according to claim 1, wherein the end effector of the robot is configured to move at least one of the plurality of parts from the supply of parts to a position adjacent the apparatus, and further wherein the end effector of the robot is configured to couple the at least one of the plurality of parts from the supply of parts onto the apparatus.

8. The system according to claim 1, wherein the end effector of the robot is configured to perform one or more of installing one or more of the plurality of parts from the supply of parts on the apparatus, assembling, system integration, testing, machining, a lay-up process, painting, sealing, fabrication, quality assurance inspection, validation, and verification.

9. The system according to claim 1, further comprising a plurality of stations including at least a first station and a second station, each of the plurality of stations being configured to perform a different task on the apparatus, wherein the global metrology device is additionally configured to track positions of each of the plurality of stations, and wherein the robot is configured to move the apparatus sequentially to each of the plurality of stations in order to perform the task.

10. The system according to claim 9, wherein each of the plurality of stations comprises a respective task robot configured to perform a different task on the apparatus.

11. The system according to claim 1, wherein the global metrology device is configured to cause coarse alignment of the robot, the supply of parts, and the apparatus, wherein the local metrology device is configured to cause fine alignment of the end effector of the robot with respect to the apparatus, the fine alignment having a higher resolution than the coarse alignment.

12. The system according to claim 4, further comprising:
   a third automated guided vehicle on which the apparatus is positioned, the third automated guided vehicle being configured to move the apparatus with respect to one or more of the supply of parts, the robot, and the global metrology device; and
   a fourth automated guided vehicle on which the global metrology device is positioned, the fourth automated guided vehicle being configured to move the global metrology device with respect to one or more of the apparatus, the robot, and the supply of parts.

13. A method of performing a manufacturing process using a system, the method comprising:
configuring a global metrology device of the system to perform global alignment of an apparatus, a robot, and a supply of parts using the global metrology device, the global metrology device being configured to track positions of the apparatus, the robot, and the supply of parts with respect to one another, wherein the global metrology device is further configured to instruct and cause movement of the apparatus, the robot, and/or the supply of parts with respect to the global metrology device, and wherein the robot is positioned on a first automated guided vehicle, the first automated guided vehicle being configured to move the robot with respect to one or more of the apparatus, the supply of parts, and the global metrology device, in response to instructions from the global metrology device;
configuring a local metrology device of the system to perform local alignment of an end effector of the robot with respect to the apparatus using the local metrology device, the local metrology device being coupled to the robot; and
enabling performance of a task on the apparatus, such that the end effector of the robot and a part from the supply of parts are used in performance of the task, wherein the supply of parts is located apart from the apparatus.

14. A method of performing a manufacturing process, the method comprising:
receiving rough alignment information from a global metrology device, the global metrology device being configured to track a respective position of each of an apparatus, a robot, and a supply of parts;
performing global alignment of the apparatus, the robot, and the supply of parts, based on the rough alignment information, wherein the robot is positioned on a first automated guided vehicle, the first automated guided vehicle being configured to move the robot with respect to one or more of the apparatus, the supply of parts, and the global metrology device;
receiving local alignment information from a local metrology device coupled to the robot; and
performing fine alignment of an end effector coupled to the robot, based on the local alignment information, the end effector being configured to perform a first task on the apparatus.

15. The method according to claim 14, wherein the performing global alignment comprises performing global alignment to a first resolution, and wherein the performing fine alignment comprises performing fine alignment to a second resolution, the second resolution being greater than the first resolution.

16. The method according to claim 14, wherein the performing global alignment of the apparatus, the robot, and the supply of parts comprises roughly positioning the apparatus, the robot, and the supply of parts, respectively, relative to the others of the apparatus, the robot, and the supply of parts.

17. The method according to claim 14, wherein the performing global alignment of the apparatus, the robot, and the supply of parts comprises roughly positioning the apparatus, the robot, and the supply of parts, to a respective absolute position.

18. The method according to claim 14, further comprising updating alignment of the end effector in response to real-time feedback received by the global metrology device.

19. The method according to claim 14, further comprising reconfiguring one or more of the robot, the apparatus, and the supply of parts to perform a different manufacturing process.

20. The method according to claim 14, wherein each of the receiving rough alignment information, performing global alignment, receiving local alignment information, and performing fine alignment is performed autonomously, the method further comprising positioning the apparatus on a second automated guided vehicle configured to move the apparatus with respect to the global metrology device, and positioning the supply of parts on a third automated guided vehicle configured to move the supply of parts with respect to the global metrology device.

21. A system for performing a task on an apparatus, the system comprising:
the apparatus;
a supply of parts comprising a plurality of parts located apart from the apparatus;
a robot having an end effector, wherein the robot is configured to obtain one or more of the plurality of parts from the supply of parts, and wherein the end effector is configured to perform the task on the apparatus using the one or more of the plurality of parts, the robot comprising a local metrology device configured to position the end effector with respect to the apparatus using a local vision system, such that the end effector is aligned with the apparatus sufficiently to perform the task;
a global metrology device configured to track positions of the apparatus, the robot, and the supply of parts with respect to one another using a global vision system, wherein the global metrology device is configured to communicate data to the robot about the positions of the apparatus and the supply of parts, and wherein the global metrology device is configured to receive feedback regarding actual positions of the robot, the apparatus, and the supply of parts, and wherein the local metrology device is configured to supplement the global metrology device in positioning the end effector; and
an automated guided vehicle on which the apparatus is positioned, the automated guided vehicle being configured to move the apparatus with respect to the supply of parts, the robot, and the global metrology device.

22. A system for performing a task on an apparatus, the system comprising:
the apparatus;
a supply of parts comprising a plurality of parts located apart from the apparatus;
a robot having an end effector, wherein the robot is configured to obtain one or more of the plurality of parts from the supply of parts, and wherein the end effector is configured to perform the task on the apparatus using the one or more of the plurality of parts, the robot comprising a local metrology device configured to position the end effector with respect to the apparatus using a local vision system, such that the end effector is aligned with the apparatus sufficiently to perform the task; and
a global metrology device configured to track positions of the apparatus, the robot, and the supply of parts with respect to one another using a global vision system, wherein the global metrology device is configured to communicate data to the robot about the positions of the apparatus and the supply of parts, and wherein the global metrology device is configured to receive feedback regarding actual positions of the robot, the apparatus, and the supply of parts, and wherein the local metrology device is configured to supplement the global metrology device in positioning the end effector;

wherein the global metrology device is positioned on an automated guided vehicle configured to move the global metrology device with respect to one or more of the apparatus, the robot, and the supply of parts.

23. A system for performing a task on an apparatus, the system comprising:

the apparatus;

a supply of parts comprising a plurality of parts located apart from the apparatus;

a robot having an end effector, wherein the robot is configured to obtain one or more of the plurality of parts from the supply of parts, and wherein the end effector is configured to perform the task on the apparatus using the one or more of the plurality of parts, the robot comprising a local metrology device configured to position the end effector with respect to the apparatus using a local vision system, such that the end effector is aligned with the apparatus sufficiently to perform the task; and a global metrology device configured to track positions of the apparatus, the robot, and the supply of parts with respect to one another using a global vision system, wherein the global metrology device is configured to communicate data to the robot about the positions of the apparatus and the supply of parts, and wherein the global metrology device is configured to receive feedback regarding actual positions of the robot, the apparatus, and the supply of parts, and wherein the local metrology device is configured to supplement the global metrology device in positioning the end effector;

wherein the supply of parts is positioned on an automated guided vehicle configured to move the supply of parts with respect to one or more of the apparatus, the robot, and the global metrology device.

* * * * *